(12) United States Patent
Tsukidate et al.

(10) Patent No.: US 9,274,511 B2
(45) Date of Patent: Mar. 1, 2016

(54) FAILSAFE OPERATION OF VEHICLE ELECTRONIC CONTROL UNIT

(75) Inventors: Tsunamichi Tsukidate, Tokyo (JP); Tasuku Ishigooka, Tokyo (JP); Fumio Narisawa, Tokyo (JP); Wataru Nagaura, Hitachinaka (JP); Hidetoshi Ogura, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/239,462

(22) PCT Filed: Jul. 31, 2012

(86) PCT No.: PCT/JP2012/069404
§ 371 (c)(1),
(2), (4) Date: Feb. 18, 2014

(87) PCT Pub. No.: WO2013/024695
PCT Pub. Date: Feb. 21, 2013

(65) Prior Publication Data
US 2014/0172227 A1    Jun. 19, 2014

(30) Foreign Application Priority Data
Aug. 18, 2011    (JP) .................................. 2011-179010

(51) Int. Cl.
*G05B 9/02* (2006.01)
*G06F 11/07* (2006.01)
*G05B 23/02* (2006.01)
*B60W 50/02* (2012.01)

(52) U.S. Cl.
CPC .............. *G05B 9/02* (2013.01); *G06F 11/0739* (2013.01); *G06F 11/0751* (2013.01); *B60W 2050/021* (2013.01); *G05B 23/0235* (2013.01); *G05B 2219/23317* (2013.01)

(58) Field of Classification Search
CPC . G06F 11/0739; G06F 11/0751; G05B 23/02; G05B 9/02
See application file for complete search history.

(56) References Cited

U.S. PATENT DOCUMENTS

| | | | | |
|---|---|---|---|---|
| 6,654,910 | B1 * | 11/2003 | Eibach ............... | G05B 19/0428 701/31.6 |
| 7,711,461 | B2 * | 5/2010 | Yokogawa .......... | G06F 11/0739 701/31.5 |
| 8,306,783 | B2 * | 11/2012 | Duc .................... | G05B 23/0251 702/185 |
| 8,775,886 | B2 * | 7/2014 | Melen et al. .................. | 714/732 |
| 2001/0041954 | A1 | 11/2001 | Maki et al. | |
| 2007/0013497 | A1 | 1/2007 | Watanabe | |
| 2011/0126082 | A1 * | 5/2011 | Pickel ................. | G06F 11/0739 714/768 |

FOREIGN PATENT DOCUMENTS

JP    2002-014839 A    1/2002
JP    2006-205878 A    8/2006
(Continued)

*Primary Examiner* — Todd Melton
(74) *Attorney, Agent, or Firm* — Volpe and Koenig, P.C.

(57) ABSTRACT

In the present invention, on the basis of the results of determining whether or not a constituent element of a vehicle control device is malfunctioning, the malfunction determination logic for determining whether or not the vehicle control device as a whole is malfunctioning is caused to be easily reusable. This vehicle control device determines the level of functional malfunction of the vehicle control device on the basis of what combination of hardware configuring the vehicle control device is malfunctioning, and executes a failsafe function that is in accordance with the level of functional malfunction (see FIG. 5).

10 Claims, 29 Drawing Sheets

(56) References Cited

FOREIGN PATENT DOCUMENTS

| JP | 2007-001333 A | 1/2007 |
| JP | 2010-163950 A | 7/2010 |
| JP | 2010-254259 A | 11/2010 |
| JP | 2010-254268 A | 11/2010 |

* cited by examiner

| name | Length |
|---|---|
| HW_ID | 2 |
| Function_ID | 1 |
| FS_Index | 4 |

108011 — name column
108012 — Length column

| HW_ID | name | HW operational state | failure determination condition | | HW failure detected frequency | failure determination threshold | HW failure determined flag |
| | | | upper threshold | lower threshold | | | |
|---|---|---|---|---|---|---|---|
| 1 | resolver | 60 | 100 | 20 | 1 | 5 | 0 |
| 2 | resolver diagnosis device | 35 | 150 | 0 | 0 | 3 | 1 |

FIG. 16

| name | Length |
|---|---|
| HW_ID | 2 |
| Function_ID | 2 |
| functional failure level determination table_Index | 4 |
| combined functional failure level determination table_Index | 9 |

| HW_ID | name | HW operational state | failure determination condition | | HW failure detected frequency | failure determination threshold | HW failure determined flag |
|---|---|---|---|---|---|---|---|
| | | | upper threshold | lower threshold | | | |
| 1 | acceleration sensor | 300 | 500 | 100 | 2 | 5 | 0 |
| 2 | acceleration sensor diagnosis device | 350 | 600 | 50 | 1 | 2 | 1 |

| Index | functional failure level | HW failure determined flag combination ||
|---|---|---|---|
| | | first HW_ID | second HW_ID |
| 1 | 0 | 0 | 0 |
| 2 | 1 | 0 | 1 |
| 3 | 2 | 1 | 0 |
| 4 | 2 | 1 | 1 |

| Function_ID | name | functional failure level |
|---|---|---|
| 1 | antiskid brake system | 1 |
| 2 | brake assist device | 2 |

210041, 210042, 210043

210050

| Index 210051 | functional failure level 210052 | functional failure level combination 210054 | |
|---|---|---|---|
| | | first Function_ID 210053 | second Function_ID 210055 |
| 1 | 0 | 0 | 2 |
| 2 | 1 | 0 | 1 |
| 3 | 3 | 0 | 2 |
| 4 | 1 | 1 | 0 |
| 5 | 2 | 1 | 1 |
| 6 | 2 | 1 | 2 |
| 7 | 2 | 2 | 0 |
| 8 | 2 | 2 | 1 |
| 9 | 2 | 2 | 2 |

| functional failure level | name | FS execution destination table address |
|---|---|---|
| 1 | functional failure information transmission | & functional failure information transmission process |
| 2 | free run | & free run process |
| 3 | brake assist | & brake assist process |

| CAN _ID | address |
|---|---|
| 100 | & antiskid brake system functional failure information |
| ⋮ | ⋮ |

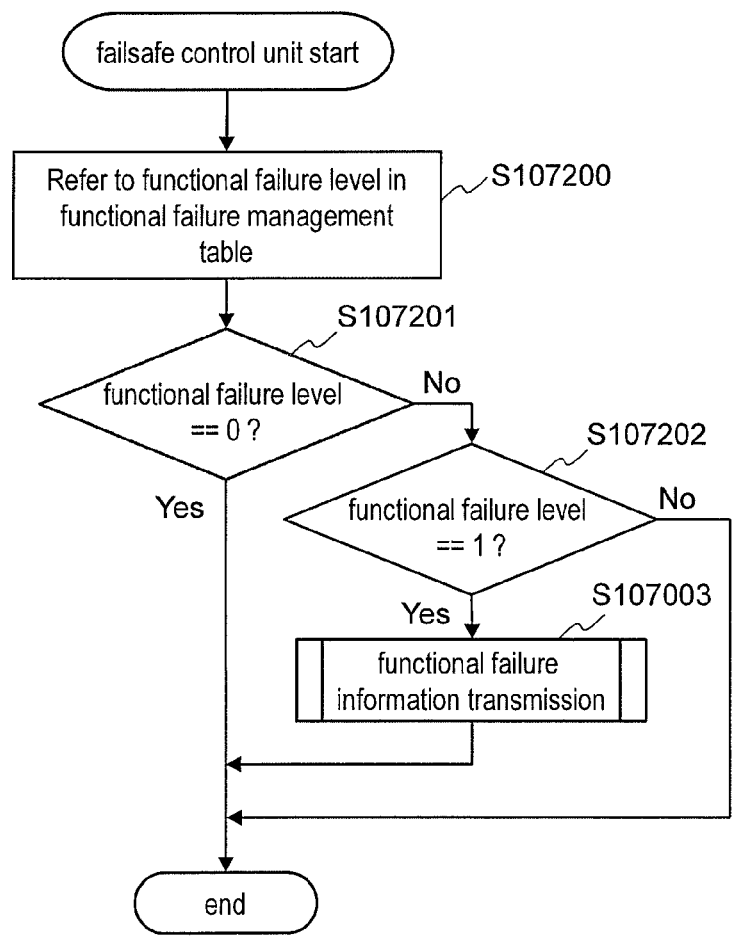

FAILSAFE OPERATION OF VEHICLE ELECTRONIC CONTROL UNIT

TECHNICAL FIELD

The present invention relates to a vehicle control device.

BACKGROUND ART

A lot of vehicle control systems in recent years comprise ECUs controlling computerized vehicle control devices (i.e. Electronic Control Unit) and in-vehicle LANs (Local Area Network) that enable communications between ECUs. CAN (Controller Area Network) is one of such in-vehicle LANs and is widely used.

Along with increase in demands for reducing environmental burden or for security, vehicle control systems are in the process of highly functionalized, distributed, and complicated. Similarly, failsafe (FS) controls that change the vehicle control system into safe states in cases of sensor failures or actuator failures are also in the process of distributed and complicated. For example, an ECU that controls actuators operating the car measures the behaviors of the actuators using sensors, and determines whether failures have occurred according to the measured result. The ECU determining the failure or an ECU receiving the determination result performs failsafe controls according to the failure determination.

In vehicle control systems, system configurations and actuators or sensors connected to ECUs are different according to car types, destinations of product, or functions selected by the user when buying the car. ECUs determine types of failsafe controls to be performed based on failure information of actuators or sensors, or frequency of failures within a predetermined timespan.

Accordingly, for each time when actuators, sensors, or diagnosis devices are changed according to car types, destinations of product, or functions selected by the user when buying the car, it is necessary to newly develop failsafe software performing failsafe controls. Therefore, there is a demand to effectively develop failsafe software.

The technique described in Patent Literature 1 listed below, by designing diagnosis programs with object-oriented techniques, intends to configure the diagnosis programs so that it is only necessary to modify corresponding objects even if components such as actuators or sensors are changed.

The technique described in Non Patent Literature 1 listed below modularizes software by unit of function depending on microcomputer or by unit of control process for sensors or actuators. Thus it is expected that it is only necessary to modify corresponding modules without modifying other modules to address hardware changes, even if hardware (HW) such as microcomputers is changed.

CITATION LIST

Patent Literature

Patent Literature 1: JP Patent Publication (Kokai) No. 2002-014839 A

Non Patent Literature

Non Patent Literature 1: AUTOSAR_EXP_LayeredSoftwareArchitecture, http://www.autosar.org/index.php?p=3&up=1&uup=2&uuup=0 (acquired on Jun. 3, 2011)

SUMMARY OF INVENTION

Technical Problem

In the technique described in Patent Literature 1, the diagnosis program can be modified by unit of object. However, the procedures of failure determination are individually different depending on combinations of car types or product destinations. Thus it is highly likely to be necessary to individually develop failure determination logics that receive determination result about whether components such as sensors are broken and that finally determine total failures. Therefore, even if diagnosis modules for each component can be modified by unit of object, it is necessary to individually develop the failure determination logics that coordinate total determinations.

The technique described in Non Patent Literature 1 modularizes programs by unit of individual component such as sensors. However, the failure determination logics determining total failures are not modularized. Thus it is also necessary to individually develop the failure determination logics as in Patent Literature 1.

The present invention is made to solve such technical problems, and an objective of the present invention is to configure the failure determination logic that determines whether the vehicle control device is broken as a whole on the basis of determination result about whether components of the vehicle control device are broken, so that the failure determination logic can be easily reused.

Solution to Problem

The vehicle control device according to the present invention determines, according to combinations of broken hardware included in the vehicle control device, functional failure levels of the vehicle control device, and performs failsafe functions corresponding to the functional failure level.

Advantageous Effects of Invention

Since the car control detection device according to the present invention determines functional failure levels according to combinations of broken hardware, it is possible to isolate the failure determination logic from each of hardware specifications. Thus it is possible to easily reuse the failure determination logic.

BRIEF DESCRIPTION OF DRAWINGS

FIG. 2 is a diagram showing an example of a table size management table 108010.

FIG. 3 is a diagram showing an example of a hardware failure management table 108020.

FIG. 16 is a diagram showing an example of a table size management table 210010.

FIG. 17 is a diagram showing an example of a HW failure management table 210020.

FIG. 18 is a diagram showing an example of a functional failure level determination table 210030.

FIG. 19 is a diagram showing an example of a functional failure level management table 210040.

FIG. 22 is a diagram showing an example of a FS management table 210070.

FIG. 23 is a diagram showing an example of a send data CAN ID table 210080.

FIG. 39 is a diagram showing an example of a send data CAN ID table 108060.

FIG. 40 is a diagram showing an operational flow of the FS control unit 107.

DESCRIPTION OF EMBODIMENTS

<Embodiment 1>

Figure 1:
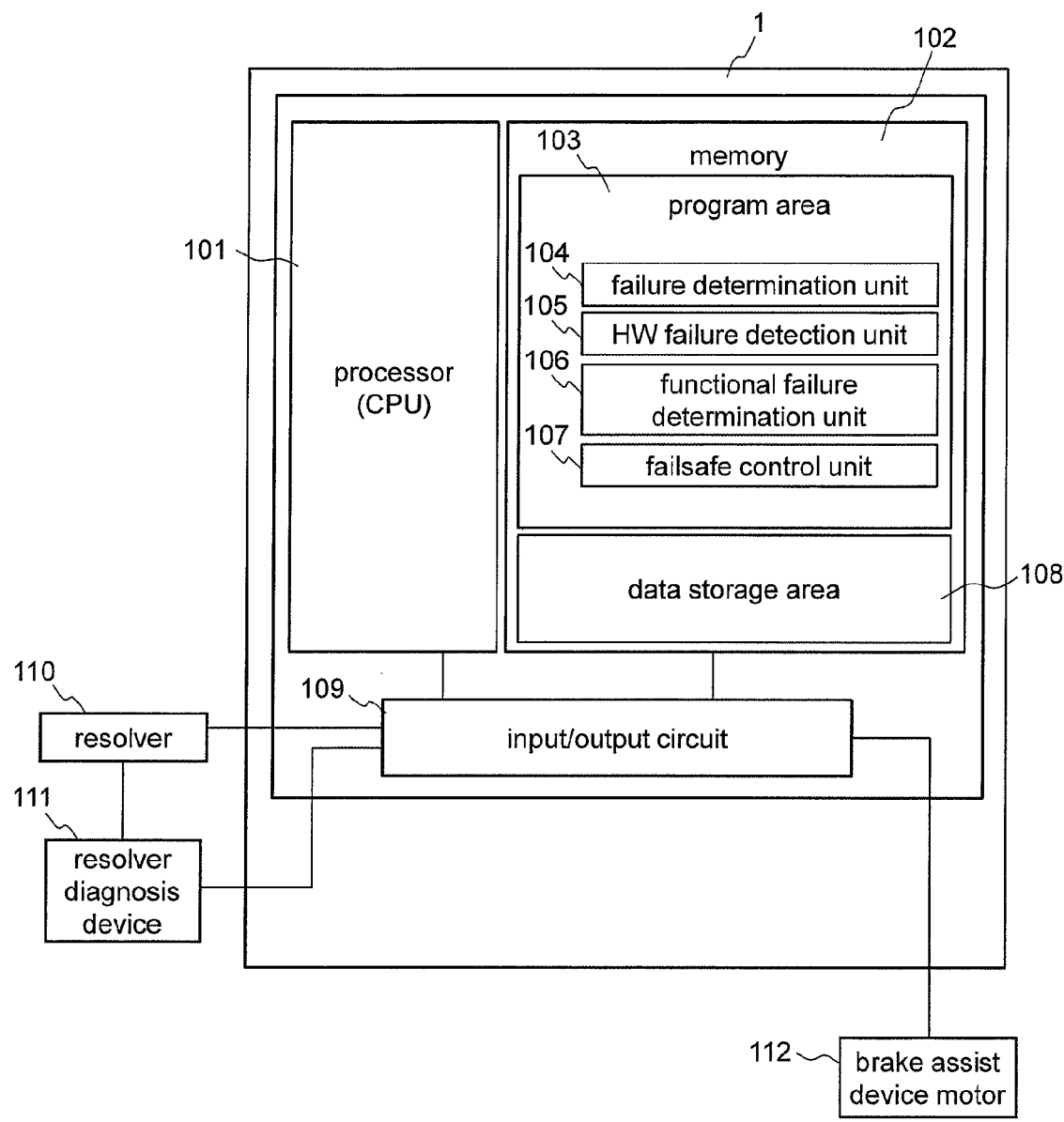
FIG. 1 is a configuration diagram of a brake assist device 1.

FIG. 1 is a configuration diagram of a brake assist device 1 according to the present invention. The brake assist device 1 is a vehicle control device controlling a brake include in a car. The brake assist device 1 comprises a processor 101, a memory 102, an input/output circuit 109, a resolver 110, a resolver diagnosis device 111, and a brake assist device motor 112.

The processor 101 is a processor (Central Processing Unit) that executes programs stored in the memory 102. The equivalent functions can be achieved using hardware such as circuit devices.

The memory 102 includes a program area 103 and a data storage area 108. The program area 103 stores a failure determination unit 104, a HW (hardware) failure detection unit 105, a functional failure determination unit 106, and a FS (failsafe) control unit 107. Functions of these programs will be described later. The data storage area 108 stores a table size management table 108010 described with FIG. 2 later, a HW failure management table 108020 described with FIG. 3 later, a functional failure level management table 108030 described with FIG. 4 later, a functional failure level determination table 108040 described with FIG. 5 later, and a FS management table 108050 described with FIG. 6 later.

The resolver 110 is a device that acquires rotational angles of motors as sensor values. The resolver diagnosis device 111 is a device that monitors the behaviors of the resolver 110 and that diagnoses whether the resolver 110 is working normally.

FIG. 2 is a diagram showing an example of the table size management table 108010. The table size management table 108010 is a table that stores numbers of records stored in each table described later, for the sake of convenience in program processes. The table size management table 108010 includes a name field 108011 and a Length field 108012.

The name field 108011 stores names of main keys in the HW failure management table 108020, in the functional failure level management table 108030, and in the functional failure level determination table 108040. The Length field 108012 stores numbers of records in the above-mentioned three tables.

FIG. 3 is a diagram showing an example of the HW failure management table 108020. The HW failure management table 108020 is a table that manages whether hardware included in the brake assist device 1 is working normally. The HW failure management table 108020 includes a HW_ID field 108021, a name field 108022, a HW operational state field 108023, a failure determination condition field 108024, an upper threshold field 108025, a lower threshold field 108026, a HW failure detected frequency field 108027, a failure determination threshold field 108028, and a HW failure determined flag field 108029.

The HW_ID field 108021 stores identifies of hardware included in the brake assist device 1. The figure only exemplifies the resolver 110 and the resolver diagnosis device 111, that are important for failure diagnosis. However, other devices may be stored. The name field 108022 stores names of hardware identified by the HW_ID field 108021. The HW operational state field 108023 stores numerical values indicating whether the hardware identified by the HW_ID field 108021 is working normally. The hardware is working normally if this numerical value is between the upper threshold field 108025 and the lower threshold field 108026. Otherwise there is some operational failure in the hardware. The HW failure detected frequency field 108027 stores frequencies of the HW operational state field 108023 excessing the range. If the frequency is equal to or above the failure determination threshold field 108028, it is determined that the brake assist device 1 is broken. The HW failure determined flag field 108029 stores "1" if the brake assist device 1 is determined to be broken according to the above-mentioned determination condition, and otherwise stores "0".

Figure 4:
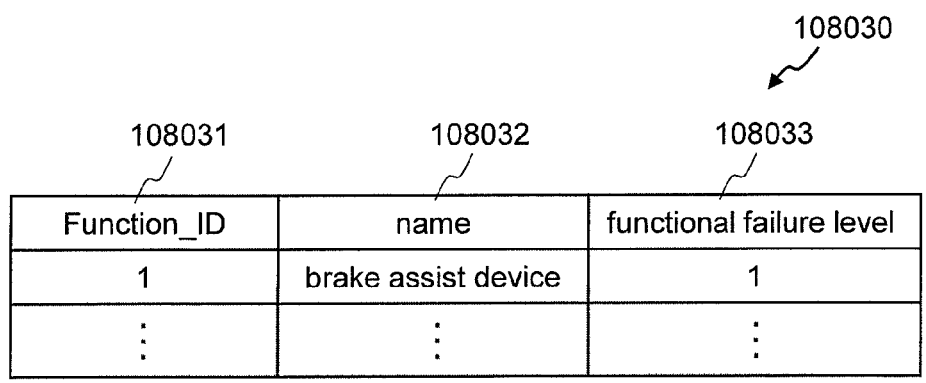
FIG. 4 is a diagram showing an example of a functional failure level management table 108030.

FIG. 4 is a diagram showing an example of the functional failure level management table 108030. The functional failure level management table 108030 is a table that manages numerical values indicating degree of failure (functional failure level) for each of functions included in the vehicle control system. Functions included in the vehicle control system mentioned here refer to each of vehicle control devices. The figure only exemplifies the brake assist device 1, thus the vehicle control system includes only one function.

The functional failure level management table 108030 includes a Function_ID field 108031, a name field 108032, and a functional failure level field 108033.

The Function_ID field 108031 stores identifiers of functions included in the vehicle control system. The name field 108032 stores names of functions identified by the Function_ID field 108031. The functional failure level field 108033 stores current functional failure levels of functions identified by the Function_ID field 108031. The functional failure level field 108033 stores "0" if the function is not broken. If the function is broken, the functional failure level field 108033 stores values indicating the failure level.

Figure 5:
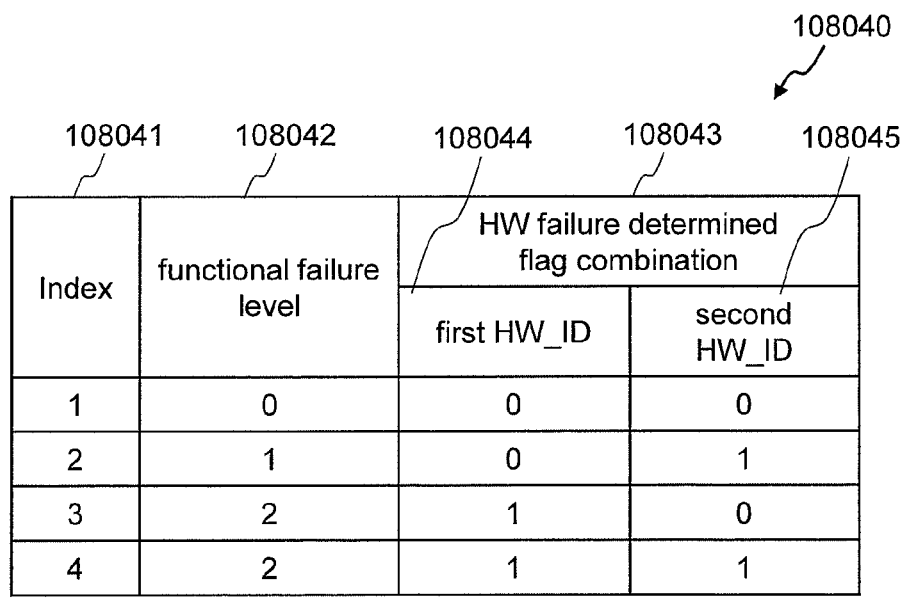
FIG. 5 is a diagram showing an example of a functional failure level determination table 108040.

FIG. 5 is a diagram showing an example of the functional failure level determination table 108040. The functional failure level determination table 108040 is a table that defines functional failure levels of the brake assist device 1 according to combinations of broken hardware included in the brake assist device 1. The functional failure level determination table 108040 includes an Index field 108041, a functional failure level field 108042, and a HW failure determined flag combination field 108043. The HW failure determined flag combination field 108043 further includes subfields as many as number of hardware included in the brake assist device 1. This example includes a first HW_ID field 108044 and a second HW_ID field 108045, each corresponding to the resolver 110 and the resolver diagnosis device 111 respectively.

The Index field 108041 is a number for identifying records. The functional failure level field 108042 stores numerical values of functional failure levels. The HW failure determined flag combination field 108043 stores "1" if the hardware included in the brake assist device 1 is broken and stores "0" if not, for each of hardware. Since the brake assist device 1 includes two devices of hardware (the resolver 110 and the resolver diagnosis device 111), this field includes two subfields corresponding to them. The first HW_ID field 108044 stores numerical values indicating whether the resolver 110 is broken. The second HW_ID field 108045 stores numerical values indicating whether the resolver diagnosis device 111 is broken.

Figures 6, 7:
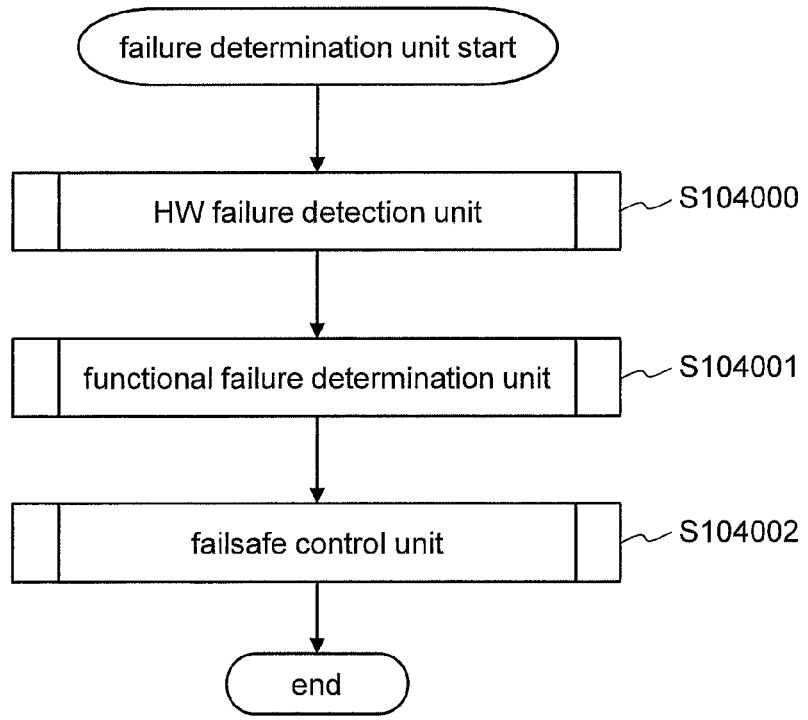
FIG. 6 is a diagram showing an example of a FS management table 108050.
FIG. 7 is a diagram showing an operational flow of a failure determination unit 104.

FIG. 6 is a diagram showing an example of the FS management table 108050. The FS management table 108050 is a table that stores storing addresses of functions describing failsafe operations corresponding to functional failure levels of the brake assist device 1. The FS management table 108050 includes a functional failure level field 108051, a name field 108052, and a FS execution destination table address field 108053.

The functional failure level field 108051 stores numerical values of functional failure levels of the brake assist device 1. The name field 108052 stores names of failsafe functions. The FS execution destination table address field 108053 stores storing addresses of functions describing failsafe operations corresponding to functional failure levels.

FIG. 7 is a diagram showing an operational flow of the failure determination unit 104. Hereinafter, each step in FIG. 7 will be described.

(FIG. 7: Step S104000)

The failure determination unit 104 calls the HW failure detection unit 105 that will be described later with FIG. 8. The HW failure detection unit 105 detects failures of HW included in the brake assist device 1.

(FIG. 7: Step S104001)

The failure determination unit 104 calls the functional failure determination unit 106 that will be described later with FIG. 9. The functional failure determination unit 106 determines the degree of failure (functional failure level of the brake assist device 1) of the brake assist device 1 as a whole.

(FIG. 7: Step S104002)

The failure determination unit 104 calls the FS control unit 107 that will be described later with FIG. 11. The FS control unit 107 performs FSs corresponding to the functional failure levels if functional failures have occurred in the brake assist device 1.

Figure 8:
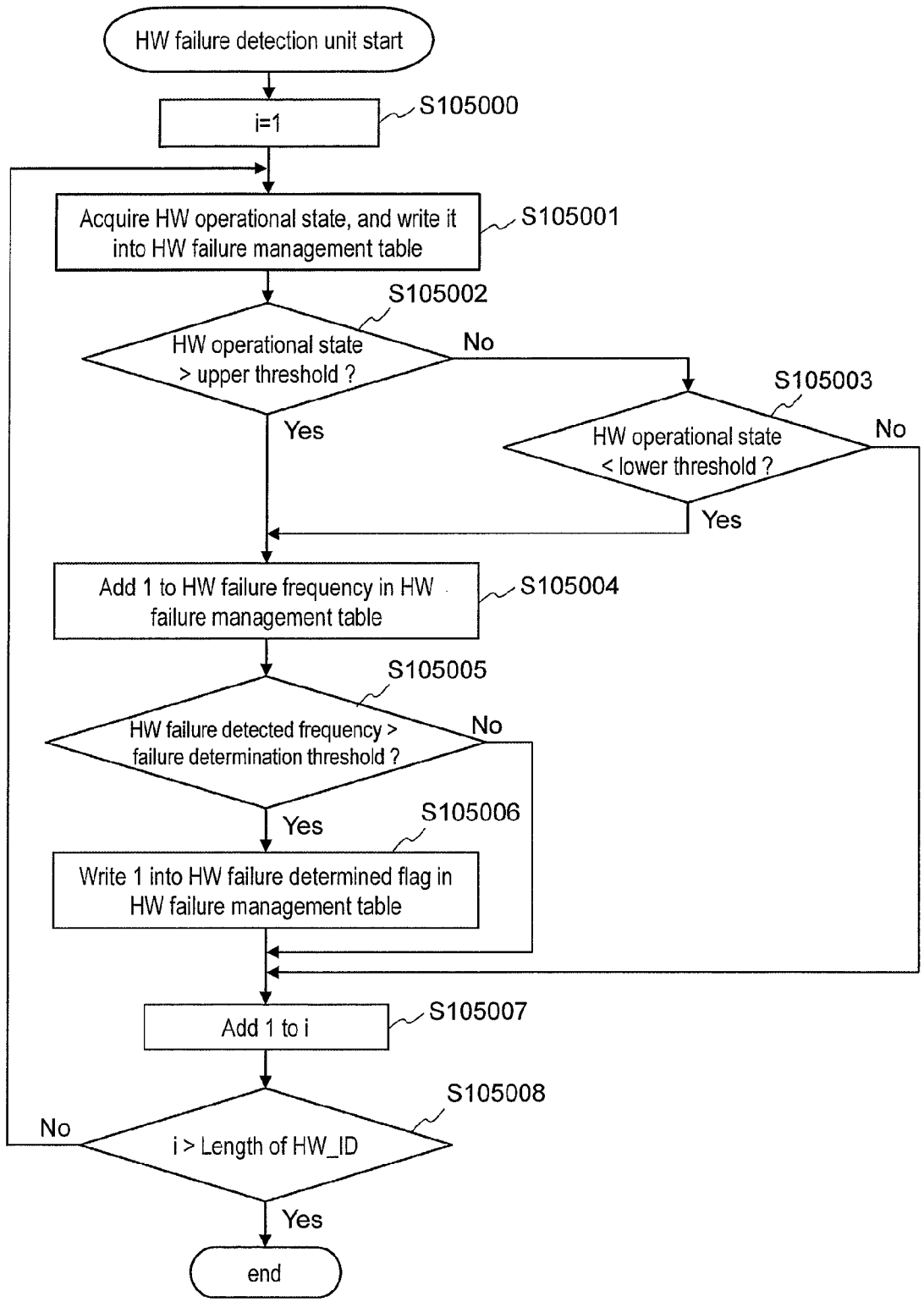
FIG. 8 is a diagram showing an operational flow of a HW failure detection unit 105.

FIG. 8 is a diagram showing an operational flow of the HW failure detection unit 105. Hereinafter, each step in FIG. 8 will be described.

(FIG. 8: Step S105000)

The HW failure detection unit 105 assigns 1 into a variable i for counting records in the HW failure management table 108020.

(FIG. 8: Step S105001)

The HW failure detection unit 105 acquires, through an input/output circuit 109, the operational state of the hardware (the resolver 110 or the resolver diagnosis device 111 in this example) having a HW_ID identical to the variable i. The HW failure detection unit 105 acquires the record in the HW failure management table 108020 having the HW_ID field 108021 identical to the variable i. The HW failure detection unit 105 writes the operational state acquired through the input/output circuit 109 into the HW operational state field 108023 of the same record.

(FIG. 8: Steps S105002-S105003)

The HW failure detection unit 105 refers to the upper threshold field 108025 and the lower threshold field 108026 of the record into which the operational state of hardware was written in step S105001. The HW failure detection unit 105 determines whether the operational state acquired in step S105001 is within these thresholds. If the operational state is within the thresholds, the process proceeds to step S105004. If not, the process skips to step S105007.

(FIG. 8: Step S105004)

The HW failure detection unit 105 adds 1 to the HW failure detected frequency field 108027 of the record into which the operational state of hardware was written in step S105001.

(FIG. 8: Step S105005)

The HW failure detection unit 105 determines whether the HW failure detected frequency field 108027 of the record into which the operational state of hardware was written in step S105001 exceeds the HW failure determination threshold 108028 of the same record. If exceeded, the process proceeds to step S105006. If not exceeded, the process skips to step S105007.

(FIG. 8: Step S105006)

The HW failure detection unit 105 writes 1 into the HW failure determined flag field 108029 of the record into which the operational state of hardware was written in step S105001.

(FIG. 8: Step S105007)

The HW failure detection unit 105 adds 1 to the variable i.

(FIG. 8: Step S105008)

The HW failure detection unit 105 acquires the Length field 108012 of the record in the table size management table 108010 in which the name field 108011 is "HW_ID". If the variable i exceeds the Length field 108012, the process terminates. If not exceeded, the process returns to step S105001.

Figure 9:
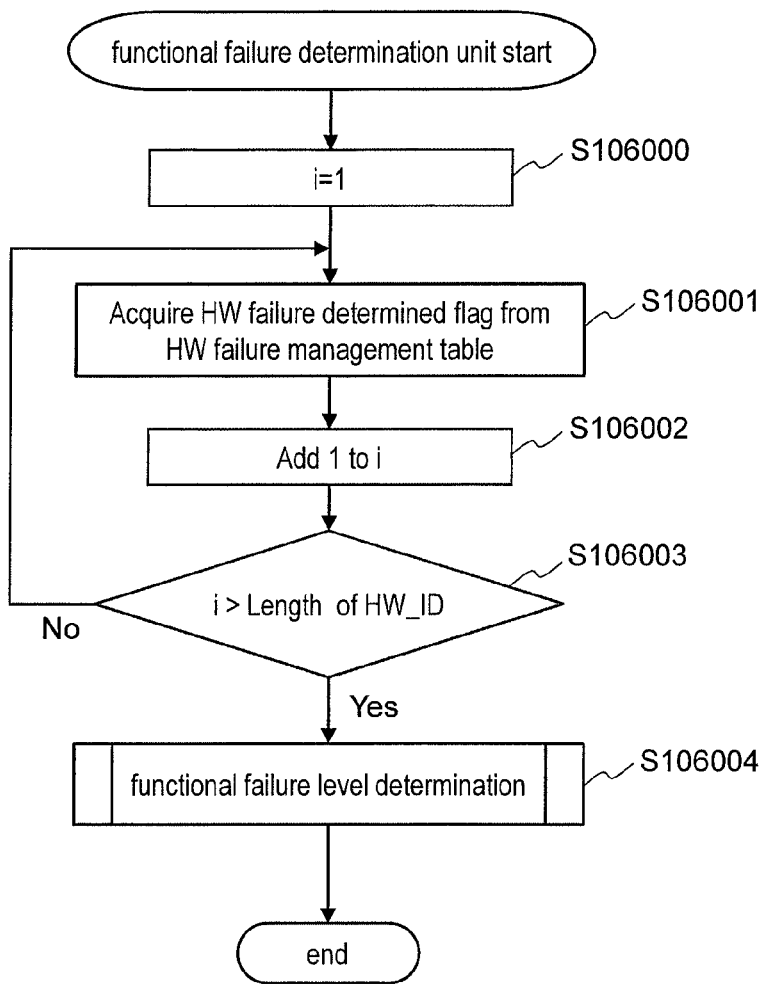
FIG. 9 is a diagram showing an operational flow of a functional failure determination unit 106.

FIG. 9 is a diagram showing an operational flow of the functional failure determination unit 106. Hereinafter, each step in FIG. 9 will be described.

(FIG. 9: Step S106000)

The functional failure determination unit 106 assigns 1 into a variable i for counting records in the HW failure management table 108020.

(FIG. 9: Step S106001)

The functional failure determination unit 106 acquires the HW failure determined flag field 108029 from the record in the HW failure management table 108020 in which the HW_ID field 108021 is identical to the variable i.

(FIG. 9: Step S106002)

The functional failure determination unit 106 adds 1 to the variable i.

(FIG. 9: Step S106003)

The functional failure determination unit 106 acquires the Length field 108012 of the record in the table size management table 108010 in which the name field 108011 is "HW_ID". If the variable i exceeds the Length field 108012, the process proceeds to step S106004. If not exceeded, the process returns to step S106001.

(FIG. 9: Step S106004)

The functional failure determination unit 106 performs the functional failure determination that will be described later with FIG. 10, and terminates the process.

Figure 10:
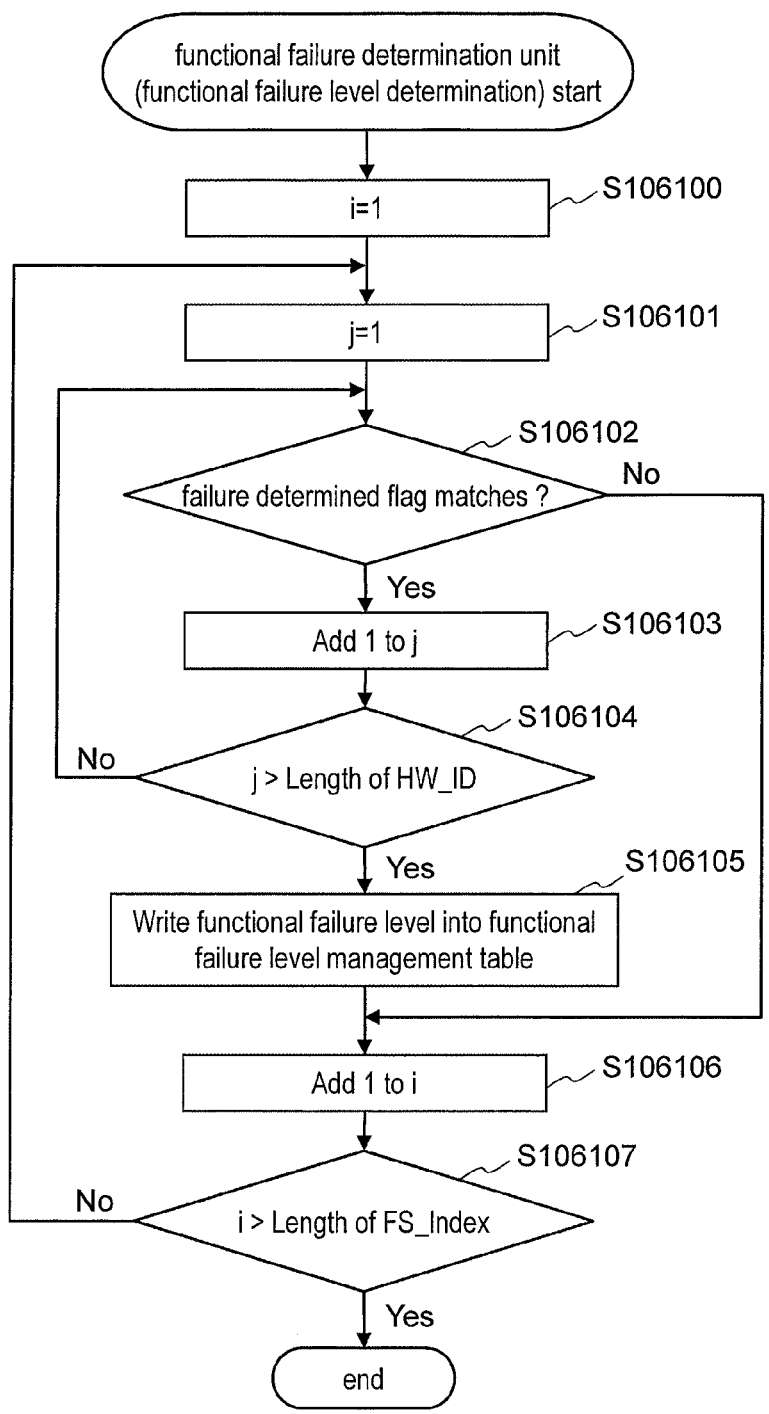
FIG. 10 is a diagram showing an operational flow of a functional failure level determination performed by the functional failure determination unit 106 in step S106004.

FIG. 10 is a diagram showing an operational flow of the functional failure determination performed by the functional failure determination unit 106 in step S106004. Hereinafter, each step in FIG. 10 will be described.

(FIG. 10: Steps S106100-S106101)

The functional failure determination unit 106 assigns 1 into variables i and j for counting records in the functional failure level determination table 108040.

(FIG. 10: Step S106102)

The functional failure determination unit 106 acquires the record in the functional failure level determination table 108040 in which the Index field 108041 is identical to the variable i. The functional failure determination unit 106 further acquires the j-th subfield of the HW failure determined flag combination field 108043 in the same record. The functional failure determination unit 106 acquires the HW failure determined flag field 108029 from the record in the HW failure management table 108020 having the HW_ID field 108021 identical to the variable j. The functional failure determination unit 106 determines whether the acquired HW failure determined flag field 108029 is identical to the j-th subfield of the HW failure determined flag combination field 108043. If identical, the process proceeds to step S106103. If not identical, the process skips to step S106106.

(FIG. 10: Step S106103)

The functional failure determination unit 106 adds 1 to the variable j.

(FIG. 10: Step S106104)

The functional failure determination unit 106 acquires the Length field 108012 of the record in the table size management table 108010 in which the name field 108011 is "HW_ID". If the variable j exceeds the Length field 108012, the process proceeds to step S106105. If not exceeded, the process returns to step S106002.

(FIG. 10: Step S106104: Additional Note)

This step is for sequentially acquiring the subfields in the HW failure determined flag combination field 108043. Since the number of subfields in the HW failure determined flag combination field 108043 is identical to the number of hardware included in the brake assist device 1, it can be acquired from the table size management table 108010.

(FIG. 10: Steps S106102-S106104: Additional Note)

These steps are for identifying the record in the functional failure level determination table 108040 that matches with the combination of whether the resolver 110 and the resolver diagnosis device 111 included in the brake assist device 1 are broken.

(FIG. 10: Step S106105)

The functional failure determination unit 106 writes the value of the functional failure level field 108042 acquired in step S106102 into the functional failure level field 108033 in the functional failure level management table 108030.

(FIG. 10: Step S106106)

The functional failure determination unit 106 adds 1 to the variable i.

(FIG. 10: Step S106107)

The functional failure determination unit 106 acquires the Length field 108012 of the record in the table size management table 108010 in which the name field 108011 is "FS_Index". If the variable i exceeds the Length field 108012, the process terminates. If not exceeded, the process returns to step S106001.

Figure 11:
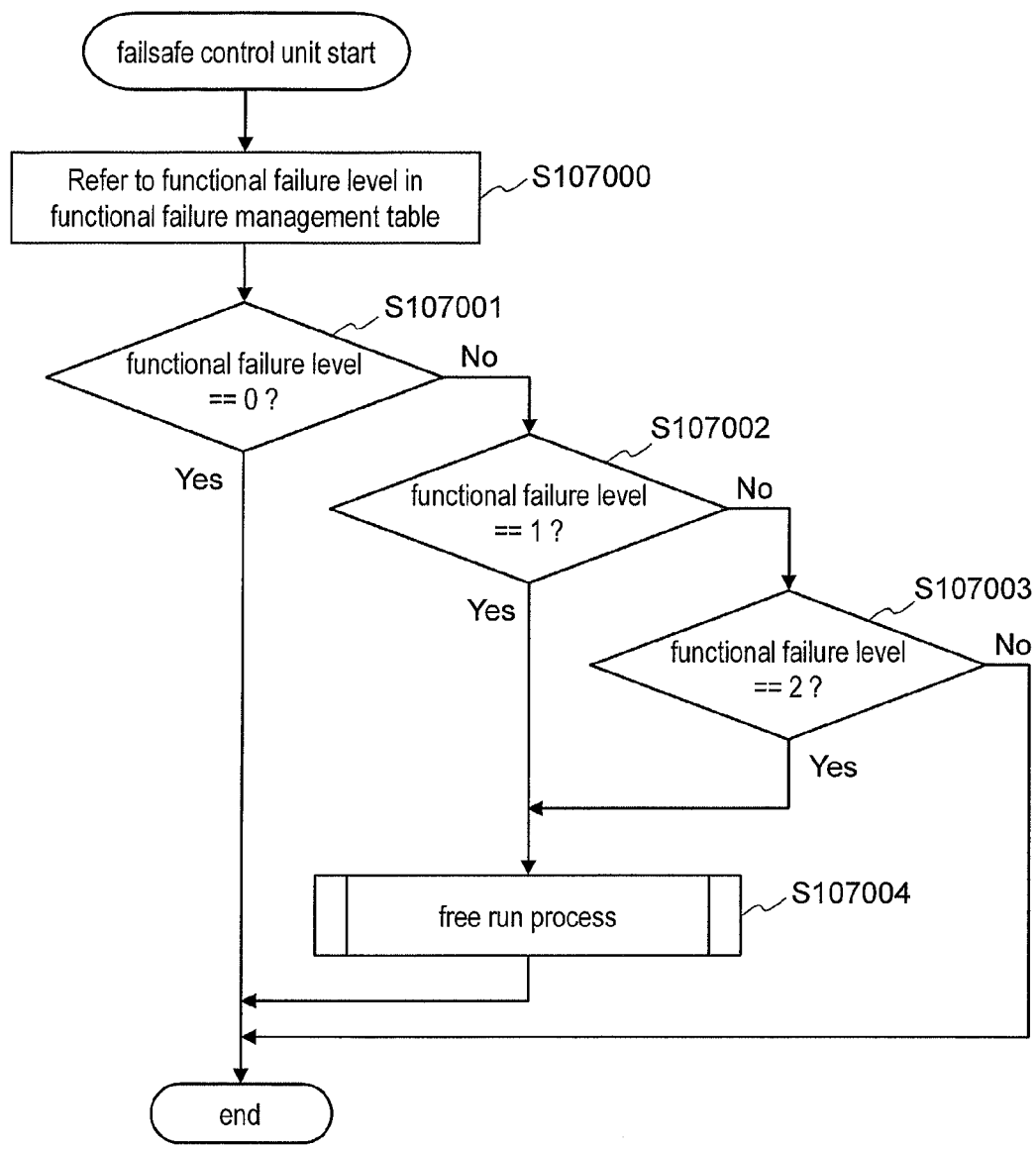
FIG. 11 is a diagram showing an operational flow of a FS control unit 107.

FIG. 11 is a diagram showing an operational flow of the FS control unit 107. Hereinafter, each step in FIG. 11 will be described.

(FIG. 11: Step S107000)

The FS control unit 107 refers to the functional failure level field 108033 in the functional failure level management table 108030.

(FIG. 11: Step S107001)

The FS control unit 107 determines whether the functional failure level field 108033 acquired in step S107000 is 0. If the field is 0, the process terminates. If not 0, the process proceeds to step S107002.

(FIG. 11: Step S107002)

The FS control unit 107 determines whether the functional failure level field 108033 acquired in step S107000 is 1. If the field is 1, the process proceeds to step S107004. If not 1, the process proceeds to step S107003.

(FIG. 11: Step S107003)

The FS control unit 107 determines whether the functional failure level field 108033 acquired in step S107000 is 2. If the field is 2, the process proceeds to step S107004. If not 1, the process terminates.

(FIG. 11: Step S107004)

The FS control unit 107 acquires, from the FS management table 108050, the process corresponding to the functional failure level specified in steps S107001-S107003, and executes the process. In the embodiment 1, the free run process is called.

Figure 12:
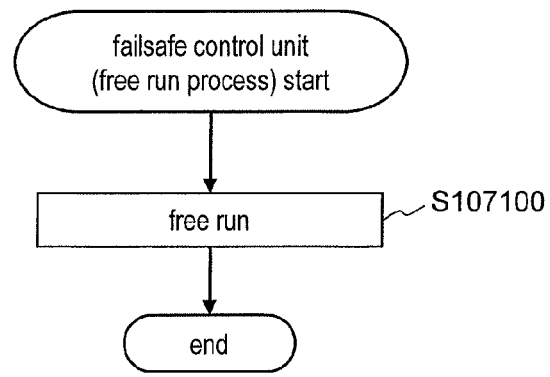
FIG. 12 is a diagram showing an operational flow of a free run performed by the FS control unit 107 in step S107004.

FIG. 12 is a diagram showing an operational flow of the free run process performed by the FS control unit in step S107004. Hereinafter, each step in FIG. 12 will be described.

(FIG. 12: Step S107100)

The FS control unit 107 stops the brake assist device motor 112, and executes the free run process.

<Embodiment 1: Summary>

As discussed thus far, the brake assist device 1 according to the embodiment 1 determines functional failure levels based on the combinations of broken hardware, and performs failsafe processes corresponding to the level. The functional failure level is a numerical value by which the failure state of hardware is abstracted, and is not dependent on the hardware configuration included in the brake assist device 1. Therefore, even if types or numbers of HW is changed, it is not necessary to modify the FS control unit 107. Thus the failure determination logic of the FS control unit 107 can be easily reused.

<Embodiment 2>

In an embodiment 2 according to the present invention, an example will be described in which: the brake assist device 1 and an antiskid brake system 2 are connected to an in-vehicle network; the functional failure level described in the embodiment 1 is transmitted through the network; and the FS control is performed using the functional failure level.

Figure 13:
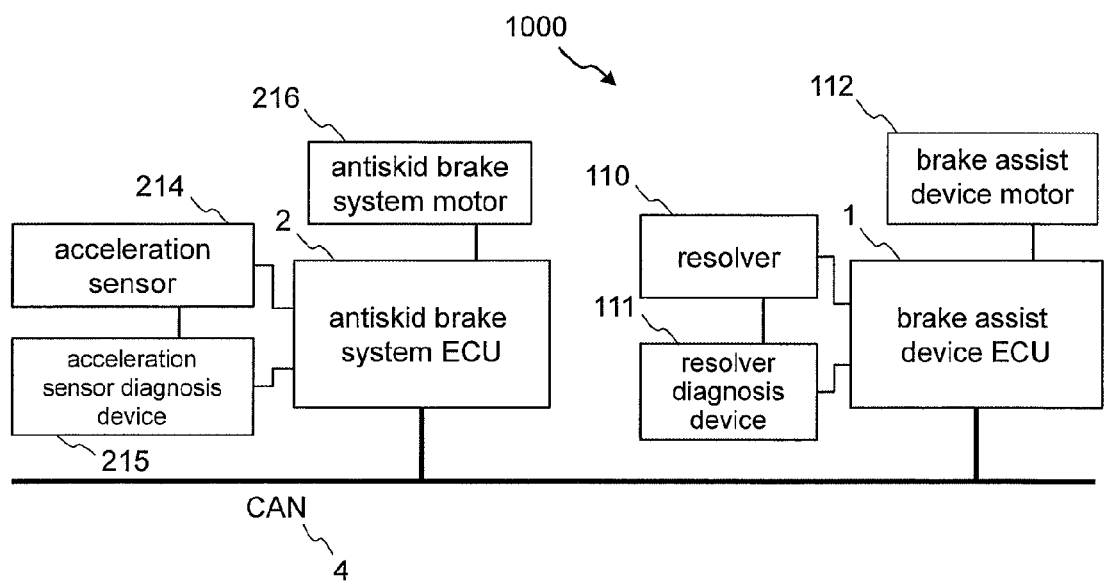
FIG. 13 is a network configuration diagram of a vehicle control system 1000 according to an embodiment 2.

FIG. 13 is a network configuration diagram of a vehicle control system 1000 according to the embodiment 2. The vehicle control system 1000 includes one or more ECUs that control the car. The ECUs are connected with each other through a network. Each ECU controls units of the car as well as communicates with other ECUs if necessary. For example, when the brake assist device 1 is broken, the brake assist device 1 sends, to a CAN 4, functional failure level information indicating the functional failure level described in the embodiment 1. Other ECUs receive the functional failure level information to perform FSs according to the value.

Figure 14:
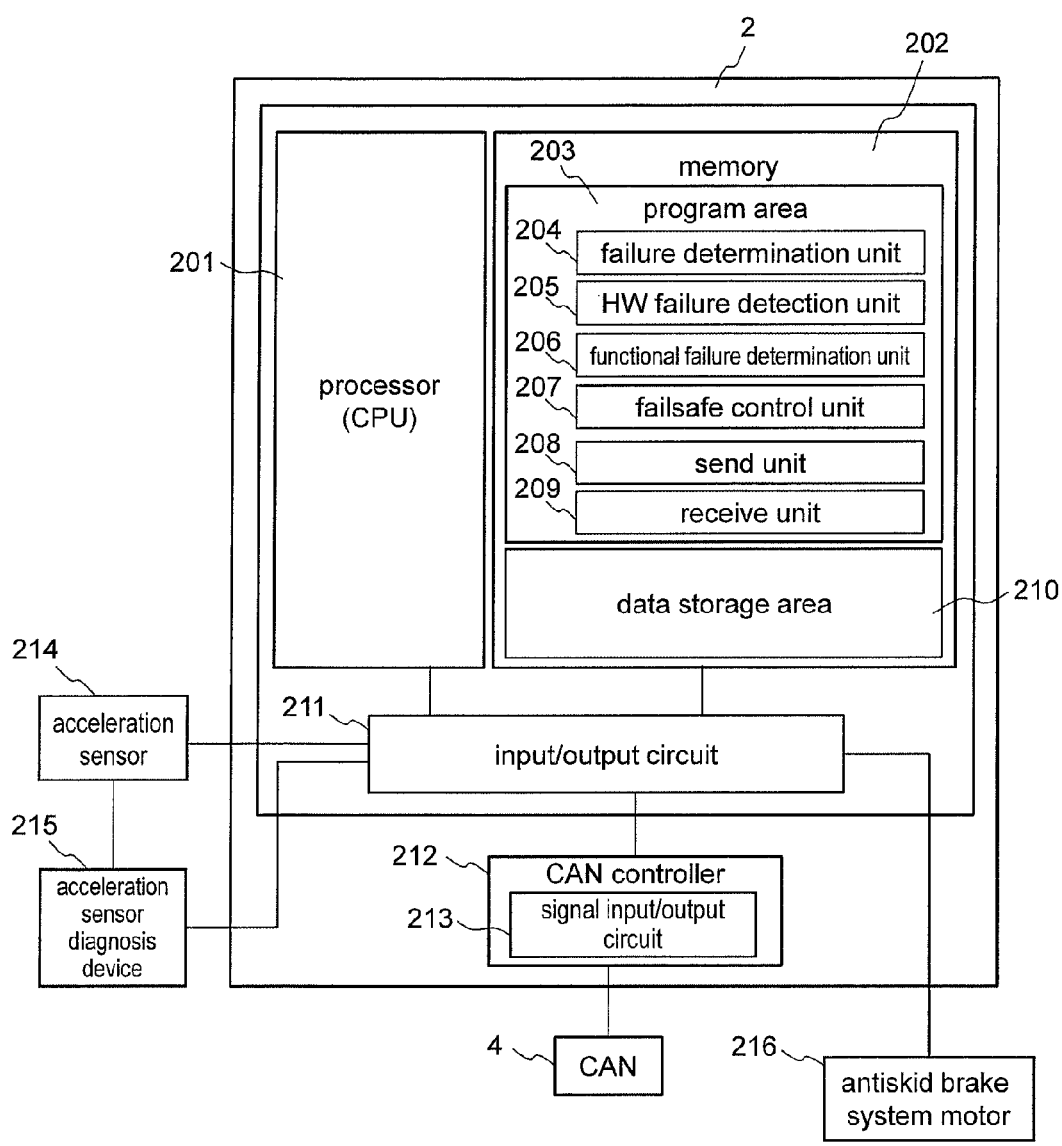
FIG. 14 is a configuration diagram of an antiskid brake system 2.

FIG. 14 is a configuration diagram of the antiskid brake system 2. The antiskid brake system 2 includes a processor 201, a memory 202, an input/output circuit 211, the CAN 4, an acceleration sensor 214, an acceleration sensor diagnosis device 215, and an antiskid brake system motor 216.

The processor 201 is a processor that executes programs stored in the memory 202. The same functions can be implemented using hardware such as circuit devices.

The memory 202 includes a program area 203 and a data storage area 210. The program area 203 stores a failure determination unit 204, a HW failure detection unit 205, a functional failure determination unit 206, a FS control unit 207, a send unit 208, and a receive unit 209. Functions of these programs will be described later. The data storage area 210 stores a table size management table 210010 described with FIG. 16 later, a HW failure management table 210020 described with FIG. 17 later, a functional failure level determination table 210030 described with FIG. 18 later, a functional failure level management table 210040 described with FIG. 19 later, a combined functional failure level determination table 210050 described with FIG. 20 later, a combined functional failure level management table 210060 described with FIG. 21 later, a FS management table 210070 described with FIG. 22 later, and a send data CAN ID table 210080 described with FIG. 23 later.

The CAN controller 212 includes a signal input/output circuit 213. The signal input/output circuit 213 performs required processes such as converting communication signals received from the CAN 4 into digital signals.

Figure 15:
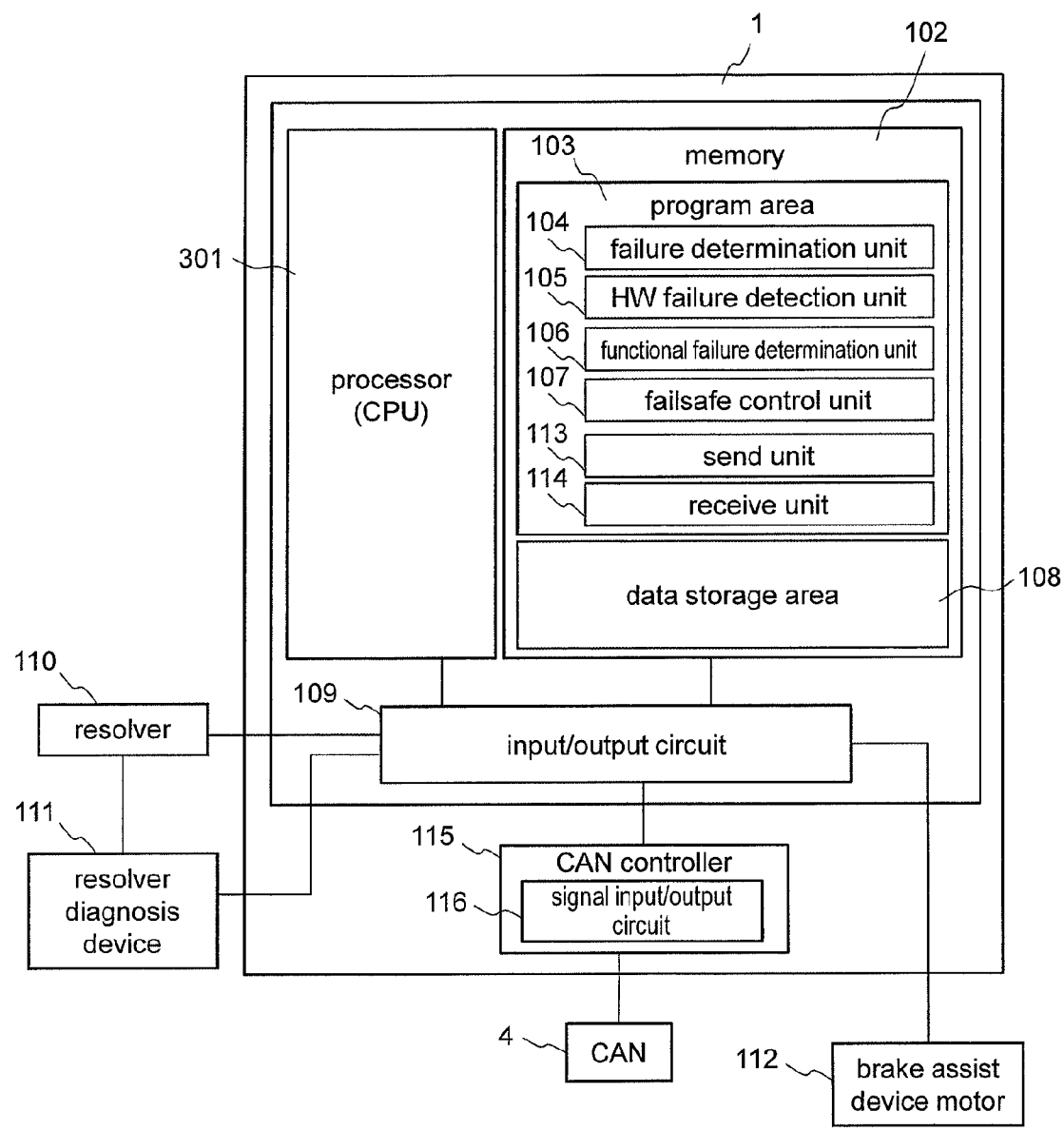
FIG. 15 is a configuration diagram of a brake assist device 1 according to the embodiment 2.

FIG. 15 is a configuration diagram of the brake assist device 1 according to the embodiment 2. In the embodiment 2, the brake assist device 1 includes a CAN controller 115 in addition to the configuration described in the embodiment 1.

The program area 103 stores a send unit 113 and a receive unit 114 in addition to each of the functional units described in the embodiment 1. The data storage area 108 stores a send data CAN ID table 108060 described with FIG. 39 in addition to each of the tables described in the embodiment 1.

The configuration of the CAN controller 115 is the same as that of the CAN controller 212 included in the antiskid brake system 2.

FIG. 16 is a diagram showing an example of the table size management table 210010. The table size management table 210010 is a table that stores numbers of records included in each of the tables, for the sake of convenience in program processes. The table size management table 210010 includes a name field 210011 and a Length field 210012.

The name field 210011 stores main key names of the HW failure management table 210020, of the functional failure level determination table 210030, of the functional failure level management table 210040, and of the combined functional failure level determination table 210050, respectively. The Length field 210012 stores numbers of records included in the above-mentioned four tables.

FIG. 17 is a diagram showing an example of the HW failure management table 210020. The HW failure management table 210020 is a table that manages whether hardware included in the antiskid brake system 2 is working normally. The HW failure management table 210020 includes a HW_ID field 210021, a name field 210022, a HW operational state field 210023, a failure determination condition field 210024, an upper threshold field 210025, a lower threshold field 210026, a HW failure detected frequency field 210027, a failure determination threshold field 210028, and a HW failure determined flag field 210029. The configuration of this table is the same as that of the HW failure management table 108020.

FIG. 18 is a diagram showing an example of the functional failure level determination table 210030. The functional failure level determination table 210030 is a table that defines functional failure levels of the antiskid brake system 2 according to combinations of broken hardware included in the antiskid brake system 2.

The functional failure level determination table 210030 includes an Index field 210031, a functional failure level field 210032, and a HW failure determined flag combination field 210033. The HW failure determined flag combination field 210033 further includes a first HW_ID field 210034 and a second HW_ID field 210035. The configuration of this table is the same as that of the functional failure level determination table 108040.

FIG. 19 is a diagram showing an example of the functional failure level management table 210040. The functional failure level management table 210040 is a table that manages numerical values indicating functional failure level for each of functions included in the vehicle control system 1000. The vehicle control system 1000 according to the embodiment 2 includes two functions of the brake assist device 1 and the antiskid brake system 2. Thus this table includes two records.

The functional failure level management table 210040 includes a Function_ID field 210041, a name field 210042, and a functional failure level field 210043. The configuration of this table is the same as that of the functional failure level management table 108030.

Figures 20, 21:
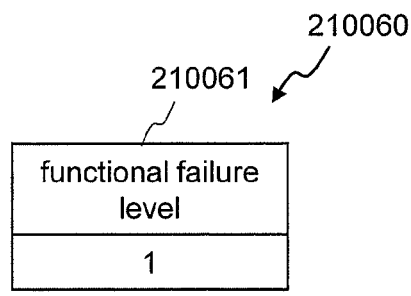
FIG. 20 is a diagram showing an example of a combined functional failure level determination table 210050.
FIG. 21 is a diagram showing an example of a combined functional failure level management table 210060.

FIG. 20 is a diagram showing an example of the combined functional failure level determination table 210050. The combined functional failure level determination table 210050 is a table that defines functional failure levels of the vehicle control system 1000 according to the combinations of broken functions included in the car system 1000.

The combined functional failure level determination table 210050 includes an Index field 210051, a functional failure level field 210052, and a functional failure level combination field 210053. The functional failure level combination field 210053 further includes a first Function_ID field 210054 and a second Function_ID field 210055.

The Index field 210051 is a number for identifying records. The functional failure level field 210052 stores numerical values of functional failure levels. The functional failure level combination field 210053 stores "1" if the function included in the vehicle control system 1000 is broken and stores "0" if not broken, for each of functions. Since the vehicle control system 1000 includes two functions (the brake assist device 1 and the antiskid brake system 2), this field includes two subfields corresponding to them. The first Function_ID field 210054 stores values indicating whether the brake assist device 1 is broken. The second Function_ID field 210055 stores values indicating whether the antiskid brake system 2 is broken.

FIG. 21 is a diagram showing an example of the combined functional failure level management table 210060. The combined functional failure level management table 210060 includes a functional failure level field 210061 that stores functional failure levels of the vehicle control system 1000.

FIG. 22 is a diagram showing an example of the FS management table 210070. The FS management table 210070 is a table that stores storing addresses of functions describing failsafe operations corresponding to functional failure levels of the vehicle control system 1000. The FS management table 210070 includes a functional failure level field 210071, a name field 210072, and a FS execution destination table address field 210073. The configuration of this table is the same as that of the FS management table 108050.

FIG. 23 is a diagram showing an example of the send data CAN ID table 210080. The send data CAN ID table 210080 is a table that stores addresses in the CAN controller 212 storing data received by the antiskid brake system 2 from the CAN 4. The send data CAN ID table 210080 includes a CAN_ID field 210081 and an address field 210082.

The CAN_ID field 210081 stores CAN IDs of data received by the antiskid brake system 2 from the CAN 4. The address field 210082 stores addresses storing communication data having the CAN ID identified by the CAN_ID field 210081.

Figure 24:
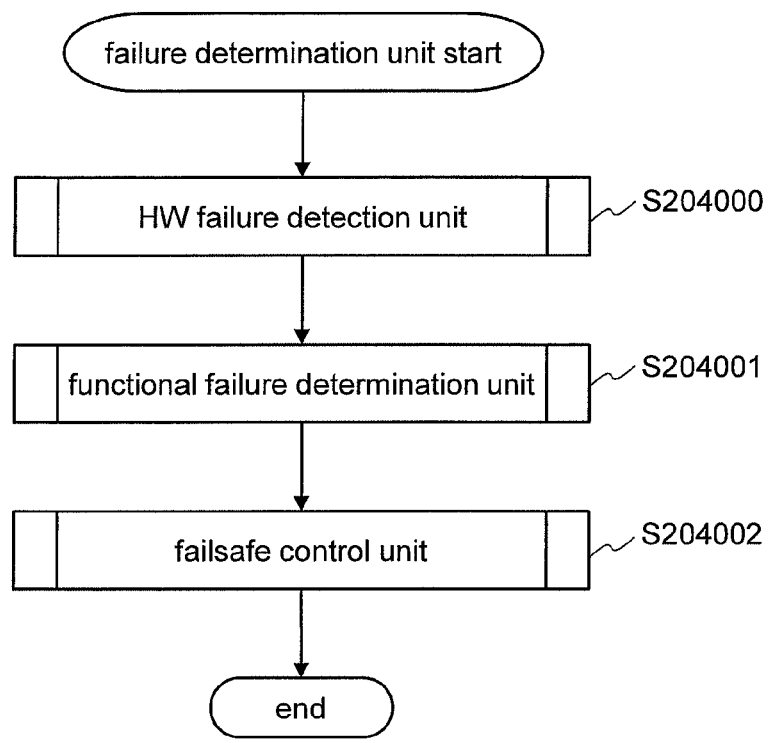
FIG. 24 is a diagram showing an operational flow of a failure determination unit 204 included in the antiskid brake system 2.

FIG. 24 is a diagram showing an operational flow of the failure determination unit 204 included in the antiskid brake system 2. Hereinafter, each step in FIG. 24 will be described.
(FIG. 24: Step S204000)
The failure determination unit 204 calls the HW failure detection unit 205 described with FIG. 25 later. The HW failure detection unit 205 detects failures of HW included in the antiskid brake system 2.
(FIG. 24: Step S204001)
The failure determination unit 204 calls the functional failure determination unit 206 described with FIG. 26 later. The functional failure determination unit 206 determines functional failure levels of the antiskid brake system 2 alone.
(FIG. 24: Step S204002)
The failure determination unit 204 calls the FS control unit 207 described with FIG. 31 later. The FS control unit 207 performs FSs corresponding to the functional failure levels if functional failure has occurred in the vehicle control system 1000.

Figure 25:
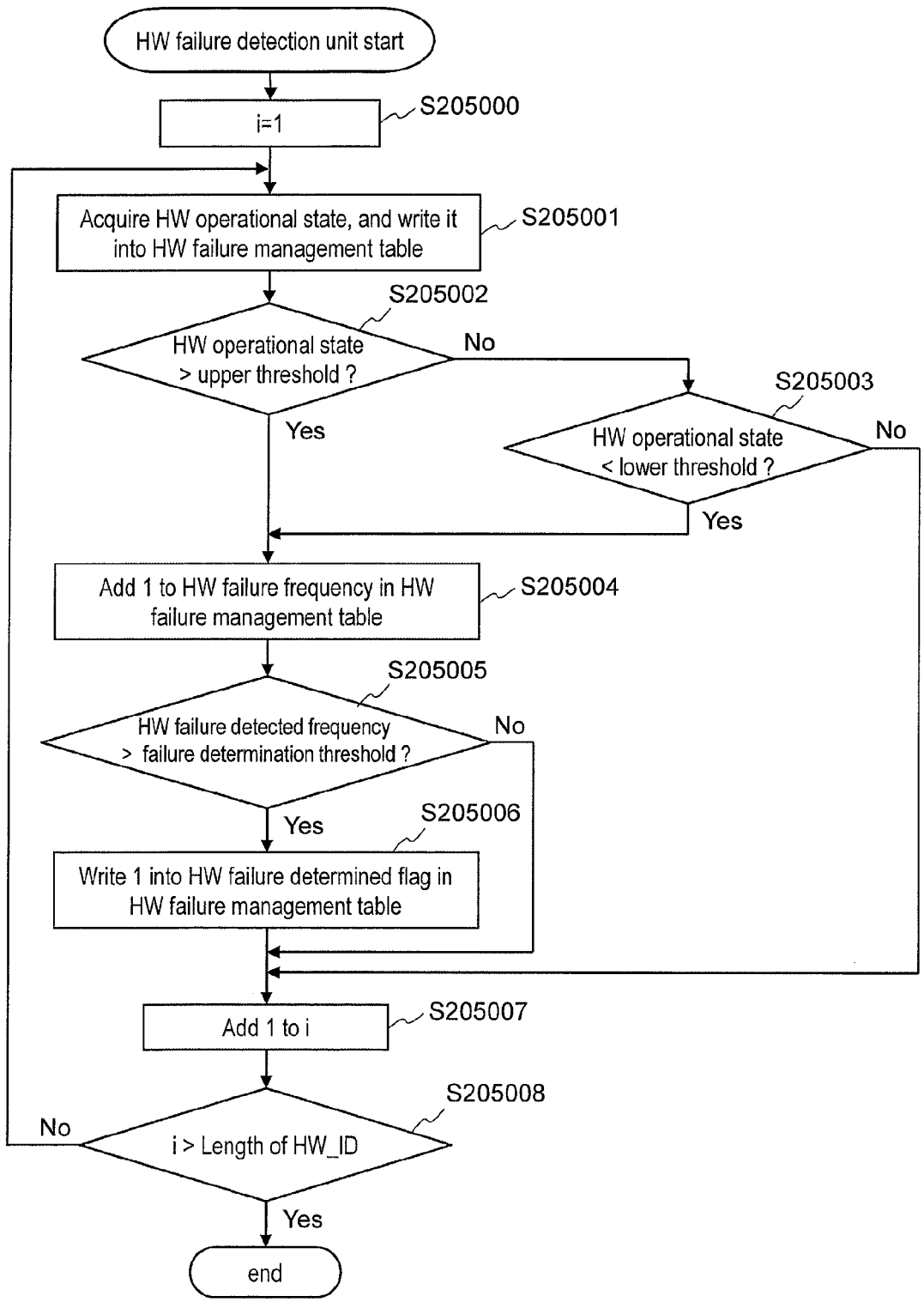
FIG. 25 is a diagram showing an operational flow of a HW failure detection unit 205.

FIG. 25 is a diagram showing an operational flow of the HW failure detection unit 205. The operation of the HW failure detection unit 205 is the same as that of FIG. 8 excluding that the HW failure management table 210020 is used instead of the HW failure management table 108020.

Figure 26:
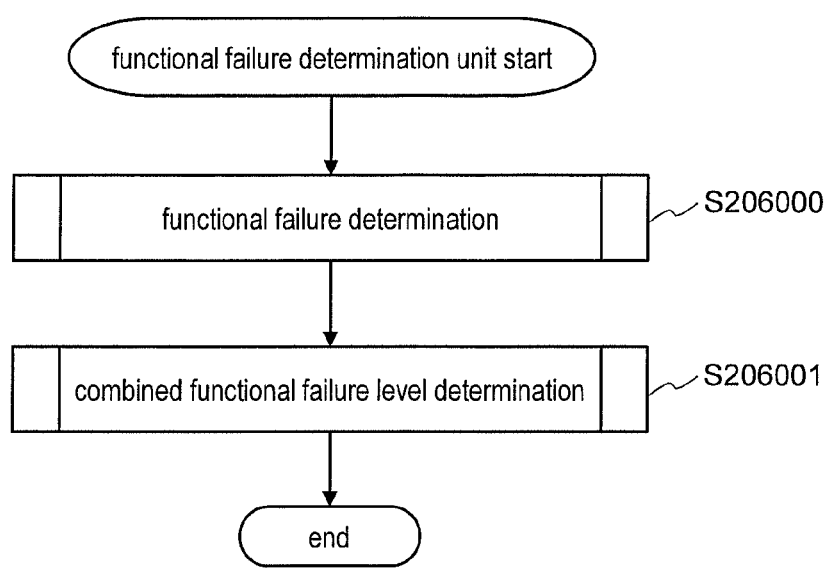
FIG. 26 is a diagram showing an operational flow of a functional failure determination unit 206.

FIG. 26 is a diagram showing an operational flow of the functional failure determination unit 206. In the embodiment 2, the determination process includes two steps so that: the functional failure levels are determined for each of the functions included in the vehicle control system 1000; and then the functional failure level of the vehicle control system 1000 as a whole is determined according to the combination of broken functions. Hereinafter, each step of FIG. 26 will be described.
(FIG. 26: Step S206000)
The functional failure determination unit 206 calls the functional failure determination process described with FIG. 27 later. This step is a process for determining the functional failure level of the antiskid brake system 2 alone.
(FIG. 26: Step S206001)
The functional failure determination unit 206 calls the combined functional failure level determination process described with FIG. 29 later. This step is a process for determining the functional failure level of the vehicle control system 1000 as a whole.

Figure 27:
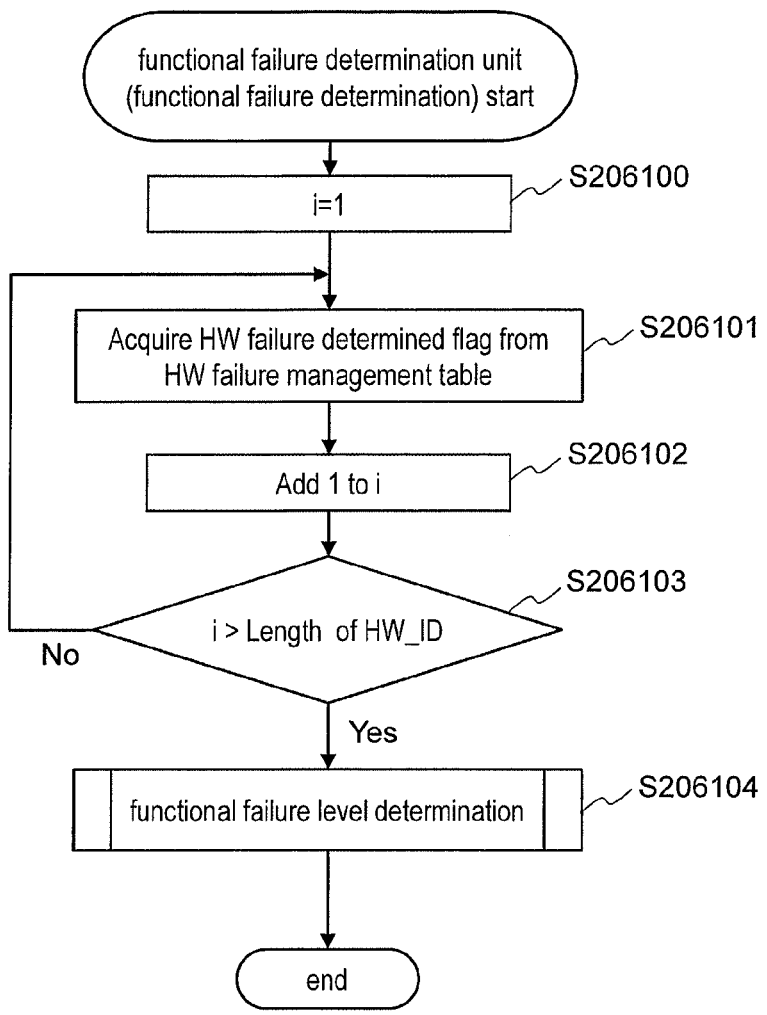
FIG. 27 is a diagram showing an operational flow of the functional failure determination unit 206 in step S206000.

FIG. 27 is a diagram showing an operational flow of the functional failure determination unit 206 in step S206000. This operational flow is the same as that of FIG. 9 excluding that the HW failure management table 210020 is used instead of the HW failure management table 108020. Note that the functional failure level determination process described with FIG. 28 later is called in step S206104.

Figure 28:
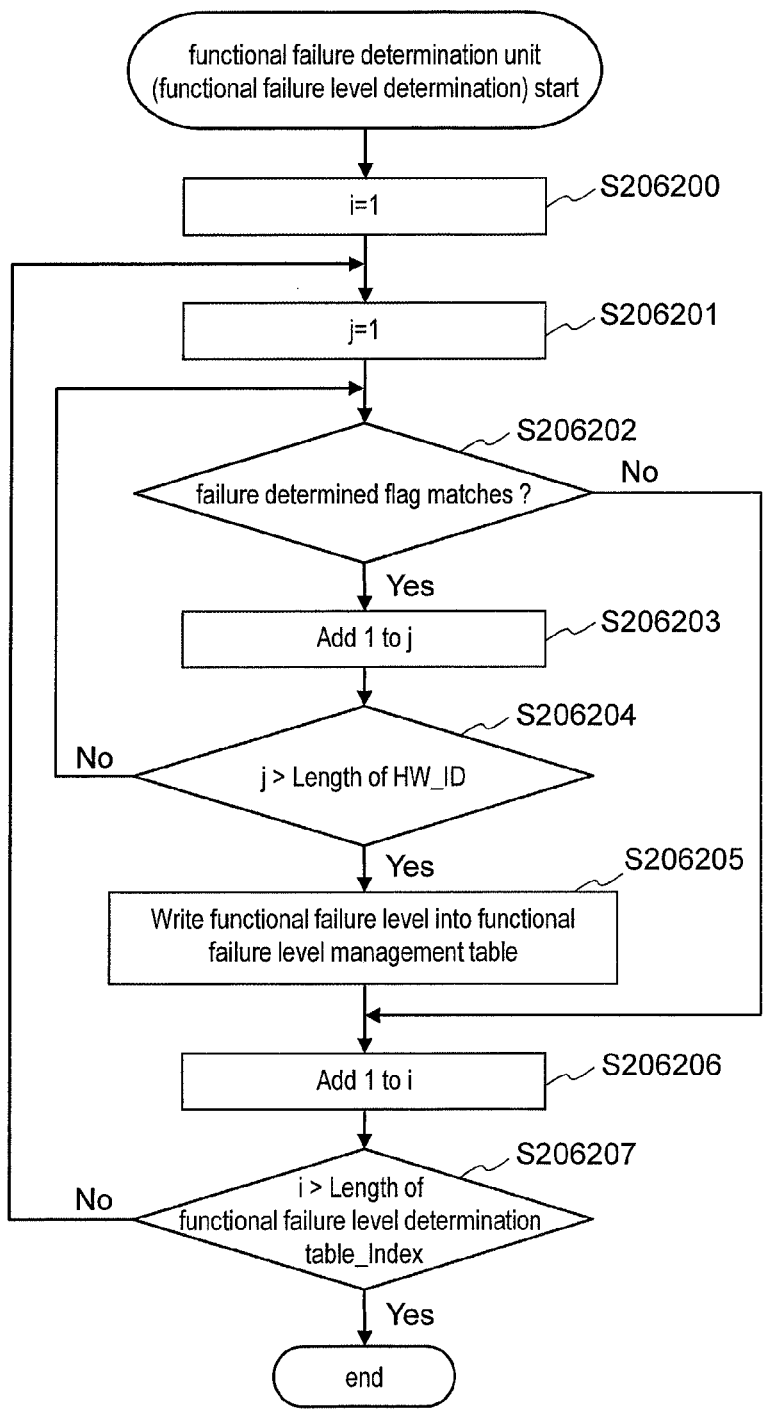
FIG. 28 is a diagram showing an operational flow of a functional failure level determination performed by the functional failure determination unit 206 in step S206104.

FIG. 28 is a diagram showing an operational flow of the functional failure level determination process performed by the functional failure determination unit 206 in step S206104. This operational flow is a process for determining functional failure levels of the antiskid brake system 2 alone according to the combination of broken hardware included in the antiskid brake system 2.

The operational flow in FIG. 28 is the same as that of FIG. 10 excluding that the table size management table 210010, the functional failure level management table 210040, and the functional failure level determination table 210030 are used instead of the table size management table 108010, the functional failure level management table 108030, and the functional failure level determination table 108040.

Figure 29:
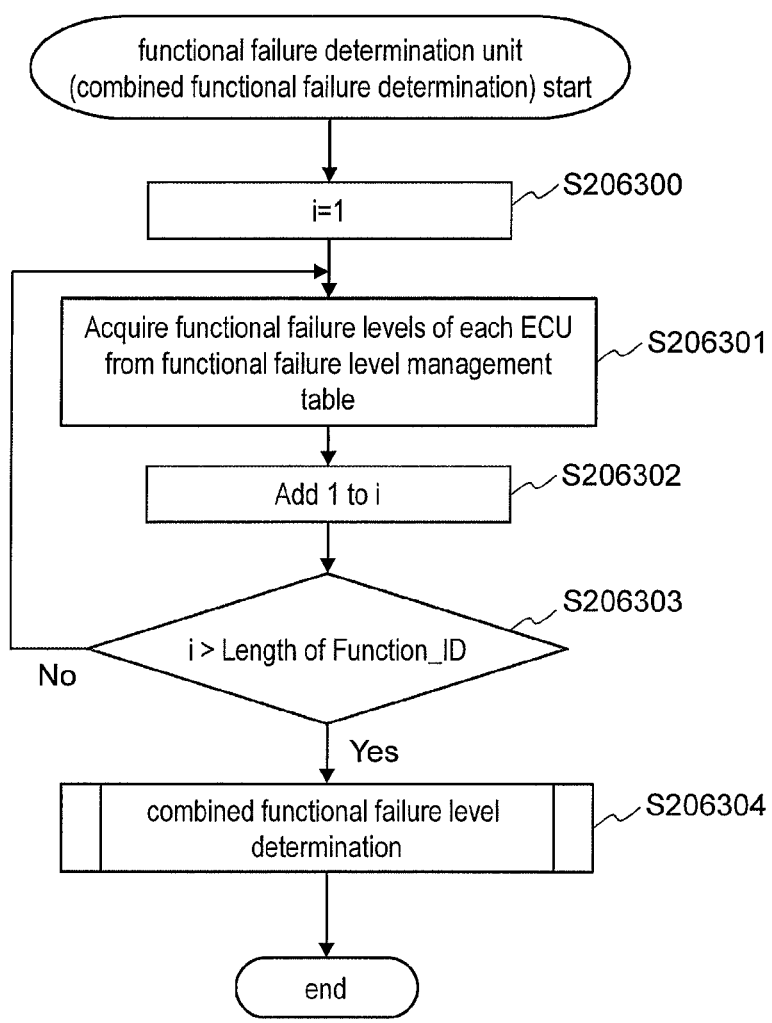
FIG. 29 is a diagram showing an operational flow of the functional failure determination unit 206 in step S206001.

FIG. 29 is a diagram showing an operational flow of the functional failure determination unit 206 in step S206001. Hereinafter, each step in FIG. 29 will be described.
(FIG. 29: Step S206300)
The functional failure determination unit 206 assigns 1 to a variable i for counting records in the functional failure level management table 210040.
(FIG. 29: Step S206301)
The functional failure determination unit 206 acquires the functional failure level field 210043 from the record in the functional failure level management table 210040 in which the Function_ID field 210041 is identical to the variable i.
(FIG. 29: Step S206302)
The functional failure determination unit 206 adds 1 to the variable i.
(FIG. 29: Step S206303)
The functional failure determination unit 206 acquires the Length field 210012 of the record from the table size management table 210010 in which the name field 210011 is "combined functional failure level determination table_Index". If the variable i exceeds the Length field 210012, the process proceeds to step S206304. If not exceeded, the process returns to step S206301.
(FIG. 29: Step S206304)
The functional failure determination unit 206 performs the functional failure level determination process described with FIG. 30 later, and then the process terminates.

Figure 30:
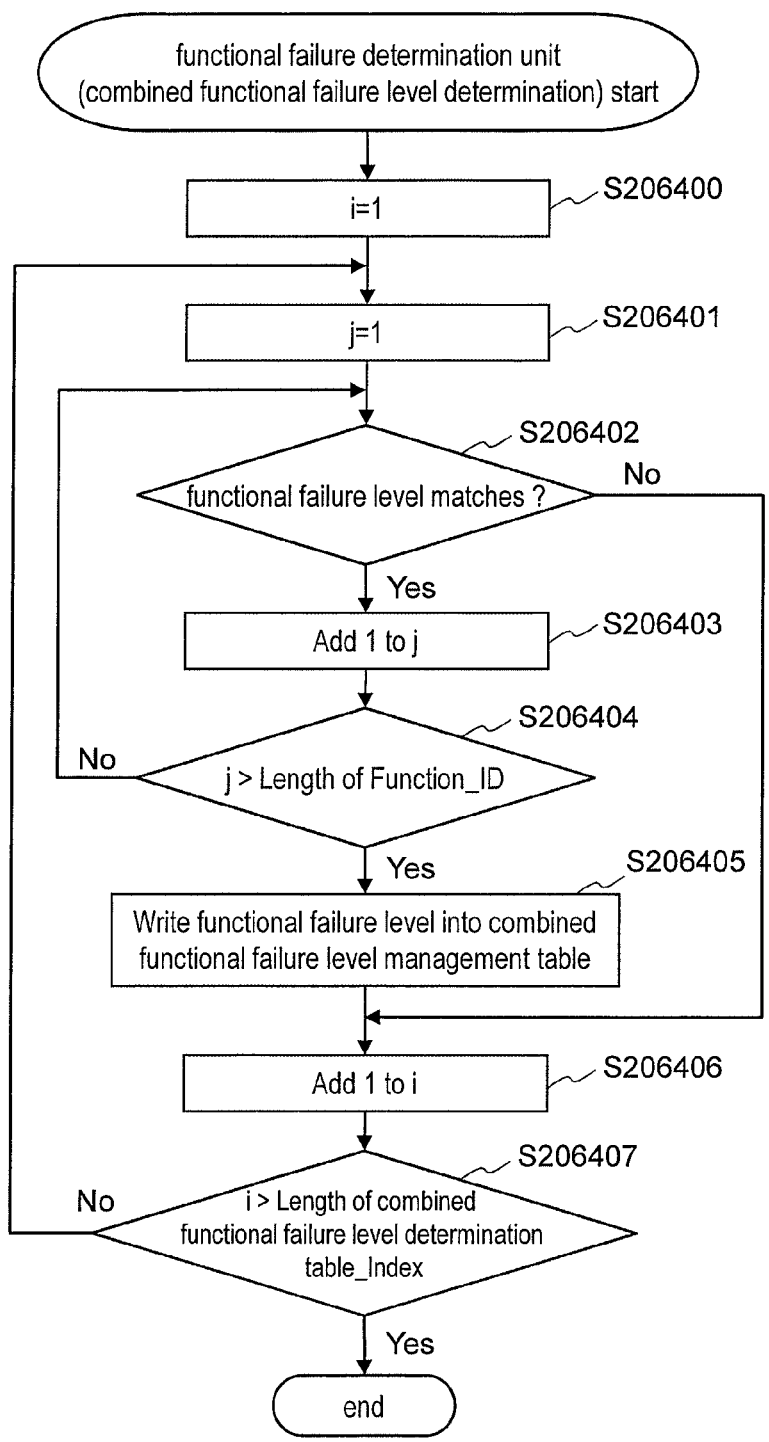
FIG. 30 is a diagram showing an operational flow of the functional failure determination unit 206 in step S206304.

FIG. 30 is a diagram showing an operational flow of the functional failure determination unit 206 in step S206304. This operational flow is for determining the functional failure level of the vehicle control system 1000 as a whole according to the combination of broken ECUs in the vehicle control system 1000.

The operational flow in FIG. 30 is the same as that of FIG. 10 excluding that the table size management table 210010, the functional failure level management table 210040, and the combined functional failure level determination table 210050 are used instead of the table size management table 108010, the HW failure management table 108020, and the functional failure level determination table 108040.

Figure 31:
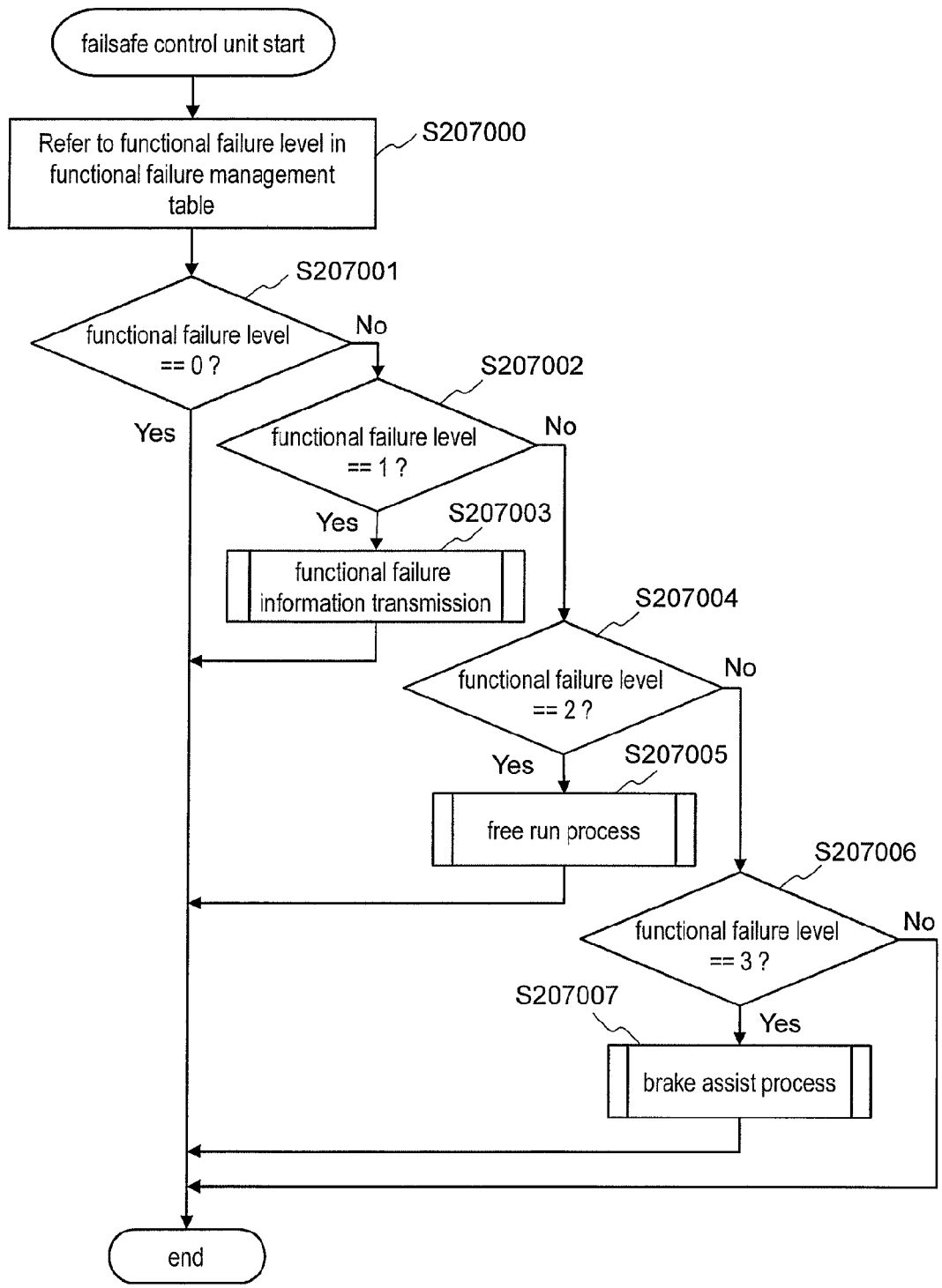
FIG. 31 is a diagram showing an operational flow of a FS control unit 207.

FIG. 31 is a diagram showing an operational flow of the FS control unit 207. This operational flow is for the antiskid brake system 2 to perform failsafe operations corresponding to the functional failure level of the vehicle control system 1000 as a whole according to the description of the FS management table 210070. Hereinafter, each step in FIG. 31 will be described.

(FIG. 31: Step S207000)

The FS control unit 207 refers to the functional failure level field 210061 in the combined functional failure level management table 210060.

(FIG. 31: Step S207001)

The FS control unit 207 determines whether the functional failure level field 210061 acquired in step S207000 is 0. If 0, the process terminates. If not 0, the process proceeds to step S207002.

(FIG. 31: Step S207002)

The FS control unit 207 determines whether the functional failure level field 210061 acquired in step S207000 is 1. If 1, the process proceeds to step S207003. If not 1, the process proceeds to step S207004.

(FIG. 31: Step S207003)

The FS control unit 207 starts the functional failure information transmission process described with FIG. 32 later.

(FIG. 31: Step S207004)

The FS control unit 207 determines whether the functional failure level field 210061 acquired in step S207000 is 2. If 2, the process proceeds to step S207005. If not 2, the process proceeds to step S207006.

(FIG. 31: Step S207005)

The FS control unit 207 starts the free run process described with FIG. 33 later.

(FIG. 31: Step S207006)

The FS control unit 207 determines whether the functional failure level field 210061 acquired in step S207000 is 3. If 3, the process proceeds to step S207007. If not 3, the process terminates.

(FIG. 31: Step S207007)

The FS control unit 207 starts the brake assist process described with FIG. 34 later.

Figure 32:
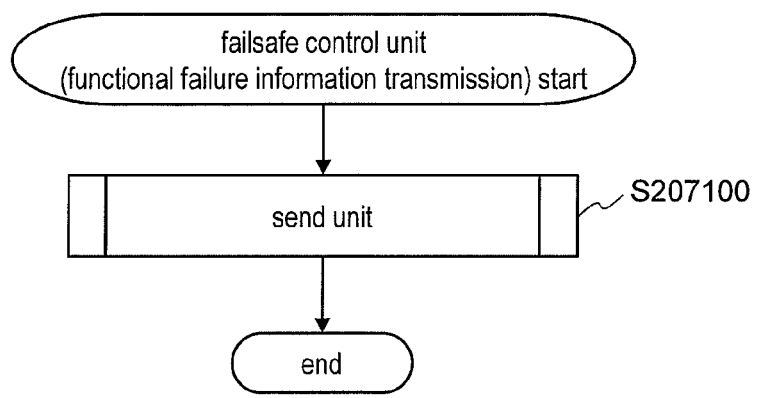
FIG. 32 is a diagram showing an operational flow of the FS control unit 207 in step S207003.

FIG. 32 is a diagram showing an operational flow of the FS control unit 207 in step S207003. Hereinafter, each step in FIG. 32 will be described.

(FIG. 32: Step S207100)

The FS control unit 207 calls the send unit described with FIG. 35 later.

Figure 33:
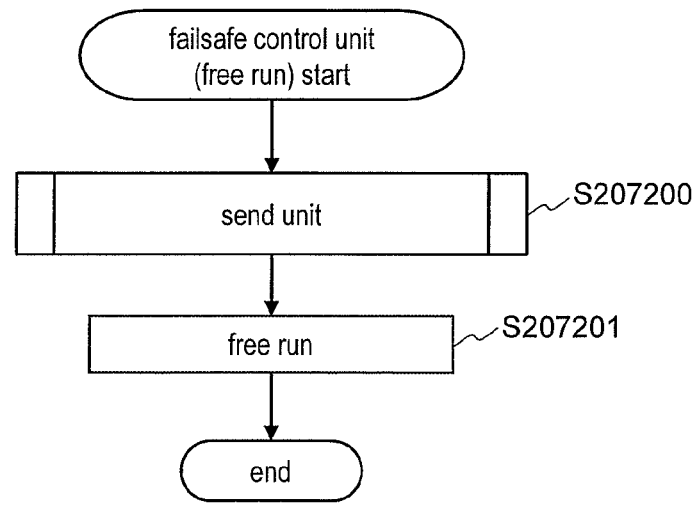
FIG. 33 is a diagram showing an operational flow of the FS control unit 207 in step S207005.

FIG. 33 is a diagram showing an operational flow of the FS control unit 207 in step S207005. Hereinafter, each step in FIG. 33 will be described.

(FIG. 33: Step S207200)

The FS control unit 207 calls the e send unit described with FIG. 35 later.

(FIG. 33: Step S207201)

The FS control unit 207 stops the antiskid brake system motor 216, and performs free run.

Figure 34:
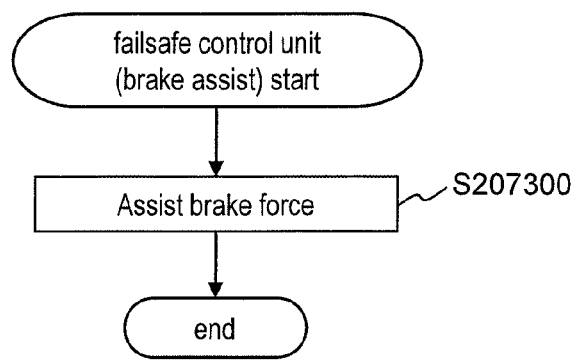
FIG. 34 is a diagram showing an operational flow of the FS control unit 207 in step S207007.

FIG. 34 is a diagram showing an operational flow of the FS control unit 207 in step S207007. Hereinafter, each step in FIG. 34 will be described.

(FIG. 34: Step S207300)

The FS control unit 207 judges that other functions providing the brake force are broken. The FS control unit 207 increases the brake force of the antiskid brake system 2.

Figure 35:
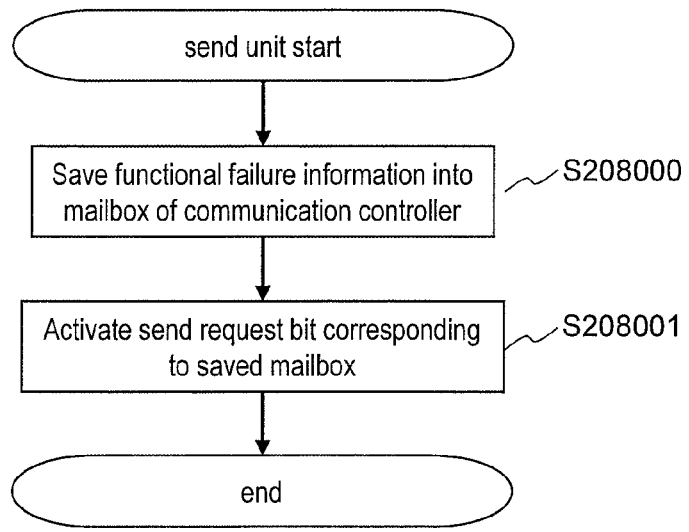
FIG. 35 is a diagram showing an operational flow of CAN transmission of a send unit 208.

FIG. 35 is a diagram showing an operational flow of the CAN send process of the send unit 208. Hereinafter, each step in FIG. 35 will be described.

(FIG. 35: Step S208000)

The send unit 208 specifies the mailbox for transmission according to the CAN ID received as a parameter. The send unit 208 saves the send data into the mailbox of the CAN controller 212.

(FIG. 35: Step S208001)

The send unit 208 activates the send request bit corresponding to the saved mailbox. The CAN controller 212 sends, to the CAN 4, the data in the mailbox in which the send request bit is activated.

Figure 36:
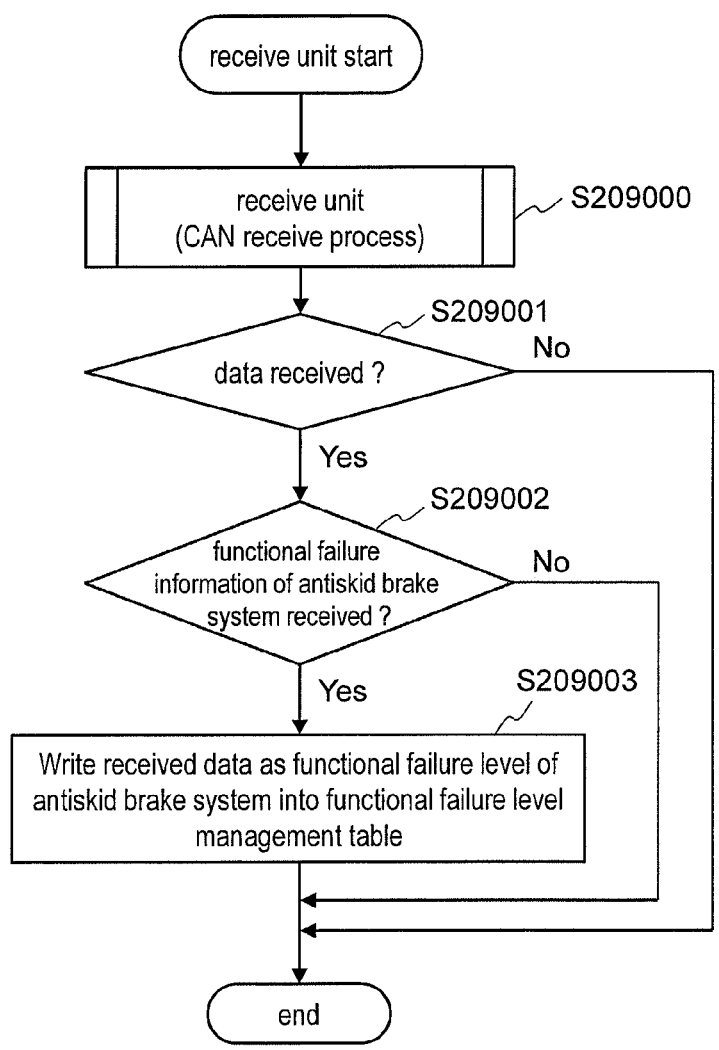
FIG. 36 is a diagram showing an operational flow of a receive unit 209.

FIG. 36 is a diagram showing an operational flow of the receive unit 209. The antiskid brake system 2 may determine its functional failure levels, or other ECUs may determine functional failure levels of the antiskid brake system 2 and may notify it to the antiskid brake system 2. In this operational flow, the latter example will be described. The functional failure levels of the antiskid brake system 2 may also be received as in this operational flow. However, details of such process are omitted here.

(FIG. 36: Step S209000)

The receive unit 209 calls the CAN receive process of the receive unit 209 described with FIG. 37 later to acquire the data received from the CAN 4.

(FIG. 36: Step S209001)

The receive unit 209 determines whether there is received data. If there is received data, the process proceeds to step S209002. If not, the process terminates.

(FIG. 36: Step S209002)

The receive unit 209 determines whether the received data is functional failure level information of the antiskid brake system 2. If the received data is functional failure level information, the process proceeds to step S209003. If not, the process terminates.

(FIG. 36: Step S209003)

The receive unit 209 writes the received data, as a functional failure level of the antiskid brake system 2, into the functional failure level management table 210040.

Figure 37:
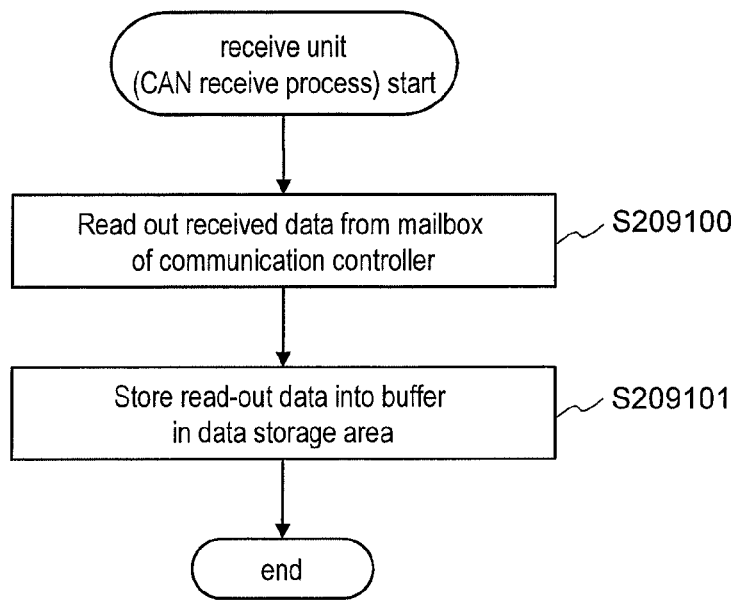
FIG. 37 is a diagram showing an operational flow of the receive unit 209 in step S209000.

FIG. 37 is a diagram showing an operational flow of the send unit 209 in step S209000. This operational flow is called at a predetermined interval (e.g. 10 ms). Hereinafter, each step in FIG. 37 will be described.

(FIG. 37: Step S209100)

The receive unit 209 specifies the mailbox that received the data from the CAN 4, and reads out the received data from the mailbox in the CAN controller 212.

(FIG. 37: Step S209101)

The receive unit 209 stores the data read-out in step S209100 into a buffer in the data storage area 210. The buffer storing the data in this step is specified as a parameter when starting this operational flow.

The operation of the antiskid brake system 2 is described so far. Hereinafter, the operation of the brake assist device 1 will be described.

Figure 38:
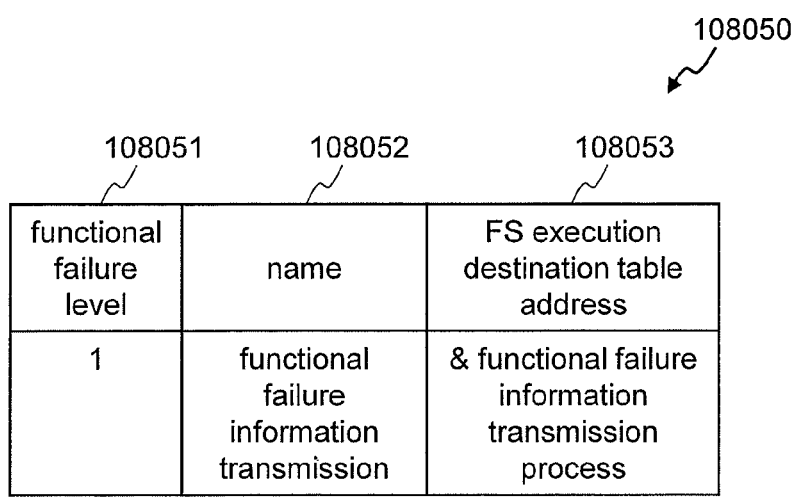
FIG. 38 is a diagram showing an example of a FS management table 108050 in the embodiment 2.

FIG. 38 is a diagram showing an example of the FS management table 108050 in the embodiment 2. The configuration of this table is the same as that of the embodiment 1. With reference to the data example shown in FIG. 38, when a functional failure level occurs in the brake assist device 1, the brake assist device 1 performs, as a failsafe process, a process to send functional failure information describing about the failure to the CAN 4.

FIG. 39 is a diagram showing an example of the send data CAN ID table 108060. The send data CAN ID table 108060 is a table that stores addresses on the CAN controller 115 storing data received by the brake assist device 1 from the CAN 4. The send data CAN ID table 108060 includes a CAN_ID field 108061 and an address field 108062. The configuration is the same as that of the send data CAN ID table 210080.

FIG. 40 is a diagram showing an operational flow of the FS control unit 107. Hereinafter, each step in FIG. 40 will be described.

(FIG. 40: Step S107200)

The FS control unit 107 refers to the functional failure level field 108033 in the functional failure level management table 108030.

(FIG. 40: Step S107201)

The FS control unit 107 determines whether the functional failure level field 108033 acquired in step S107200 is 0. If 0, the process terminates. If not 0, the process proceeds to step S107202.

(FIG. 40: Step S107202)

The FS control unit 107 determines whether the functional failure level field 108033 acquired in step S107200 is 1. If 1, the process proceeds to step S107203. If not 1, the process terminates.

(FIG. 40: Step S107203)

The FS control unit 107 starts the functional failure information transmission process described with FIG. 41 later.

Figure 41:
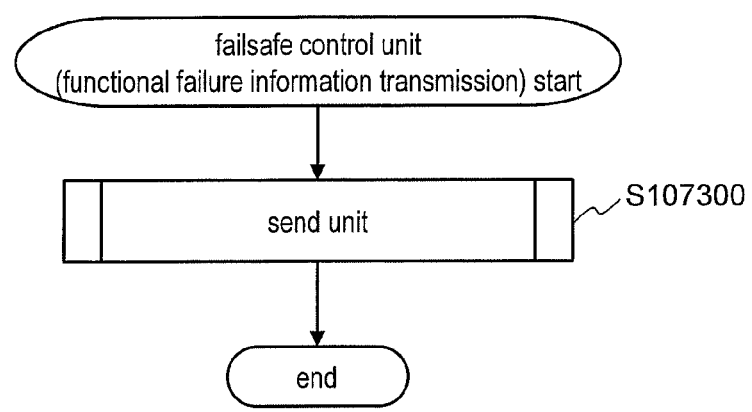
FIG. 41 is a diagram showing an operational flow of the FS control unit 107 in step S107203.

FIG. 41 is a diagram showing an operational flow of the FS control unit 107 in step S107203. Hereinafter, each step in FIG. 41 will be described.

(FIG. 41: Step S107300)

The FS control unit 107 calls the send unit 113.

<Embodiment 2: Summary>

As discussed thus far, the antiskid brake system 2 according to the embodiment 2 determines the functional failure level of the vehicle control system 1000 as a whole according to the combination of functional failure levels of functions (each ECU) included in the vehicle control system 1000, and performs failsafe operations corresponding to the functional failure level of the vehicle control system 1000. The rule for determining the functional failure level of the vehicle control system 1000 as a whole is based on the combination of broken functions (each ECU). Therefore, even if types or numbers of ECUs included in the vehicle control system 1000 are changed, it is not necessary to modify the FS control unit 207. Thus the failure determination logic of the FS control unit 207 can be easily reused.

In addition, when adding new functions (ECUs) to the vehicle control system 1000 in the embodiment 2, it is only necessary to modify data items of the functional failure level management table 210040 and of the combined functional failure level determination table 210050 to handle added functions.

In addition, the antiskid brake system 2 according to the embodiment 2 receives functional failure levels of the antiskid brake system 2 or of the brake assist device 1 from the CAN 4, and determines the functional failure level of the vehicle control system 1000 according to the received functional failure levels to perform failsafe operations. If the antiskid brake system 2 receives functional failure levels of the antiskid brake system 2 from the CAN 4, it is not necessary for the antiskid brake system 2 to include the HW failure detection unit 205.

<Embodiment 3>

In the embodiments 1-2 described above, a process is described in which the flags (such as HW failure determined flag 108029) indicating whether hardware included in each ECU is broken are modified from 0 to 1. However, the flags may be modified from 1 to 0. For example, if no failure is detected for a predetermined duration after the HW failure determined flag 108029 becomes 1, the HW failure determined flag 108029 may be modified into 0 (reset).

In the embodiment 2, only the antiskid brake system 2 and the brake assist device 1 are exemplified as ECUs included in the vehicle control system 1000. However, other ECUs may be provided. In addition, the failsafe operations performed by each ECU in the embodiments are examples, and other failsafe operations may be performed.

REFERENCE SIGNS LIST

1: brake assist device
101: processor
102: memory
103: program area
104: failure determination unit
105: HW failure detection unit
106: functional failure determination unit
107: FS control unit
108: data storage area
108010: table size management table
108020: HW failure management table
108030: functional failure level management table
108040: functional failure level determination table
108050: FS management table
108060: send data CAN ID table
109: input/output circuit
110: resolver
111: resolver diagnosis device
112: brake assist device motor
113: send unit
114: receive unit
115: CAN controller
116: signal input/output circuit
2: antiskid brake system
201: processor
202: memory
203: program area
204: failure determination unit
205: HW failure detection unit
206: functional failure determination unit
207: FS control unit
208: send unit
209: receive unit
210: data storage area
210010: table size management table
210020: HW failure management table
210030: functional failure level determination table
210040: functional failure level management table
210050: combined functional failure level determination table
210060: combined functional failure level management table
210070: FS management table
210080: send data CAN ID table
211: input/output circuit
212: CAN controller
213: signal input/output circuit 214: acceleration sensor
215: acceleration sensor diagnosis device
216: antiskid brake system motor
4: CAN
1000: vehicle control system

The invention claimed is:

1. A vehicle control device that executes a function to control a motor vehicle, comprising:
   a failure detection unit that receives operational state information indicating operational states of a plurality of hardware components in the motor vehicle and determines whether one or more of the plurality of hardware components includes a failure based on the received operational state information, the plurality of hardware components being in communication with and separate from the vehicle control device;
   a functional failure determination unit that receives failure information indicating the determined failure of the one or more hardware components and determines, based on the received failure information, a functional failure level from a plurality of functional failure levels, each indicating a degree of an impact on a behavior of a system comprising the plurality of hardware components; and
   a failsafe control unit that performs a failsafe operation corresponding to the determined functional failure level;
   wherein the functional failure determination unit determines, without depending on a hardware component type and a number of the plurality of hardware components, the functional failure level according to a combination of any number of hardware components determined to include a failure and any number of hardware components determined to not include a failure, and
   wherein the failsafe control unit specifies the failsafe operation corresponding to the functional failure level determined by the functional failure determination unit, and performs the specified failsafe operation.

2. The vehicle control device according to claim 1, further comprising a functional failure level determination table that describes a relationship between the combination of the broken hardware components and the functional failure level determined according to the combination, wherein the functional failure determination unit determines the functional failure level by referring to the functional failure level determination table using the combination of the hardware in which a failure is detected by the failure detection unit.

3. The vehicle control device according to claim 1, wherein the functional failure determination unit determines that the combination of the broken hardware components with high importance indicates the functional failure level higher than the functional failure level indicated by the combination of the broken hardware components with low importance.

4. The vehicle control device according to claim 1, wherein the failure detection unit acquires a numerical value indicating an operational state of each of the plurality of hardware components, and determines that one or more of the hardware components are broken if the numerical value corresponding to the one or more hardware components exceeds a predetermined range.

5. The vehicle control device according to claim 1, further comprising an interface connecting to an in-vehicle network, wherein the functional failure determination unit determines, according to a combination of vehicle control devices connected to the in-vehicle network that are not working normally, a system functional failure level of a vehicle control system including multiple vehicle control devices connected to the in-vehicle network, and wherein the failsafe control unit performs a failsafe operation corresponding to the system functional failure level.

6. The vehicle control device according to claim 5, further comprising a combined functional failure level determination table that describes a relationship between the combination of the vehicle control devices connected to the in-vehicle network that are not working normally and the system functional failure level determined by the combination, wherein the functional failure determination unit determines the system functional failure level by referring to the combined functional failure level determination table using the combination of the vehicle control devices that are not working normally.

7. The vehicle control device according to claim 5, further comprising a receive unit that receives, from the in-vehicle network, functional failure information indicating that the vehicle control device connected to the in-vehicle network is not working normally, wherein the functional failure determination unit determines the system functional failure level using the functional failure information received by the receive unit.

8. A vehicle control system comprising:
   a plurality of the vehicle control devices according to claim 5; and
   an in-vehicle network to which the multiple of the vehicle control devices are connected;
   wherein the vehicle control device includes a receive unit that receives, from the in-vehicle networks, functional failure information indicating that the vehicle control device connected to the in-vehicle network is not working normally,
   wherein one of the vehicle control devices sends functional failure information describing the functional failure level to other one of the vehicle control devices, and
   wherein the vehicle control device receiving the functional failure information determines the system functional failure level using the functional failure information received by the receive unit, and performs a failsafe operation corresponding to the system functional failure level.

9. A vehicle control system comprising:
   a plurality of the vehicle control devices according to claim 1; and
   an in-vehicle network to which the multiple of the vehicle control devices are connected;
   wherein one of the vehicle control devices sends functional failure information describing the functional failure level to other one of the vehicle control devices, and
   wherein the vehicle control device receiving the functional failure information performs a failsafe operation corresponding to a functional failure level described by the functional failure information.

10. The vehicle control device according to claim 1, wherein the failsafe control unit specifies the failsafe operation corresponding to the functional failure level by referring to a table describing a relationship between the functional failure level determined by the functional failure determination unit and the failsafe operation, and performs the specified failsafe operation.

* * * * *